(12) United States Patent
Al Rawi et al.

(10) Patent No.: US 11,006,002 B2
(45) Date of Patent: May 11, 2021

(54) METHOD AND APPARATUS FOR TRANSMITTING DATA FROM A TRANSMITTER DEVICE TO ONE OR MORE RECEIVER DEVICES

(71) Applicant: British Telecommunications Public Limited Company, London (GB)

(72) Inventors: Anas Al Rawi, London (GB); Leslie Humphrey, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 16/338,106

(22) PCT Filed: Sep. 27, 2017

(86) PCT No.: PCT/EP2017/074515
§ 371 (c)(1),
(2) Date: Mar. 29, 2019

(87) PCT Pub. No.: WO2018/060259
PCT Pub. Date: Apr. 5, 2018

(65) Prior Publication Data
US 2020/0028972 A1  Jan. 23, 2020

(30) Foreign Application Priority Data
Sep. 29, 2016  (EP) .................................... 16191623

(51) Int. Cl.
*H04M 11/06* (2006.01)
*H04B 3/487* (2015.01)
(Continued)

(52) U.S. Cl.
CPC .......... *H04M 11/062* (2013.01); *H04B 3/487* (2015.01); *H04L 5/0007* (2013.01); *H04L 5/20* (2013.01)

(58) Field of Classification Search
CPC .................................................. H04M 11/062
(Continued)

(56) References Cited

U.S. PATENT DOCUMENTS 6,507,608 B1  1/2003  Norrell
6,961,303 B1  11/2005  Binder
(Continued)

FOREIGN PATENT DOCUMENTS

CN    101218776    7/2008
CN    102668611    9/2012
(Continued)

OTHER PUBLICATIONS

Application and Filing Receipt for U.S. Appl. No. 16/338,106, filed Mar. 29, 2019, Inventor(s): Al Rawi et al.
(Continued)

*Primary Examiner* — Lihong Yu
(74) *Attorney, Agent, or Firm* — Patterson Thuente Pedersen, P.A.

(57) ABSTRACT

A transmitter for transmitting data, using a discrete multi-tone modulation technique, to one or more receiver devices, each of which is connected to the transmitter device via at least one respective pair of wires, each receiver device being operable to receive signals detected as a change over time in the potential difference across the local ends of each respective pair of wires extending between the receiver and the transmitter device, is operable to transmit signals onto the wires extending between the transmitter device and the one or more receiver devices in a plurality of different modes, over a plurality of different channels, the different modes including phantom and differential modes and the different channels including a first set of phantom channels. The transmitter is further operable to select a second set of phantom channels from the first set, the second set being a
(Continued)

subset of the first set comprising some or all of the phantom channels of the first set such that at least some of the phantom channels.

4 Claims, 5 Drawing Sheets

(51) Int. Cl.
  *H04L 5/00* (2006.01)
  *H04L 5/20* (2006.01)
(58) Field of Classification Search
  USPC .......................................................... 375/257
  See application file for complete search history.

(56) References Cited

U.S. PATENT DOCUMENTS

| | | | |
|---|---|---|---|
| 7,359,428 | B2 | 4/2008 | Rovini et al. |
| 7,392,301 | B1* | 6/2008 | Perry, Jr. ................. H04L 29/06 370/241.1 |
| 7,561,625 | B1 | 7/2009 | Searles et al. |
| 8,416,864 | B2 | 4/2013 | Korobkov et al. |
| 8,675,469 | B2 | 3/2014 | Anschutz et al. |
| 8,780,686 | B2 | 7/2014 | Sands et al. |
| 8,848,555 | B2 | 9/2014 | Lindqvist |
| 9,020,145 | B2 | 4/2015 | Liang et al. |
| 9,083,785 | B2 | 7/2015 | Goodson et al. |
| 9,088,350 | B2 | 7/2015 | Pereira |
| 9,225,826 | B2 | 12/2015 | Shi et al. |
| 9,287,928 | B2 | 3/2016 | Clausen |
| 9,362,959 | B2 | 6/2016 | Kuipers et al. |
| 9,548,792 | B2 | 1/2017 | Schenk et al. |
| 10,091,022 | B2 | 10/2018 | Horsley et al. |
| 10,193,594 | B2 | 1/2019 | Al Rawi et al. |
| 10,305,716 | B2 | 5/2019 | Humphrey et al. |
| 2004/0186865 | A1 | 9/2004 | Schenk |
| 2005/0002441 | A1 | 1/2005 | Rovini et al. |
| 2006/0268966 | A1 | 11/2006 | Cioffi et al. |
| 2008/0212709 | A1 | 9/2008 | Wiley |
| 2009/0270038 | A1 | 10/2009 | Clausen et al. |
| 2009/0302965 | A1 | 12/2009 | Lee et al. |
| 2010/0054314 | A1 | 3/2010 | Korobkov et al. |
| 2010/0135374 | A1 | 6/2010 | Kozek et al. |
| 2011/0150057 | A1 | 6/2011 | Anschutz et al. |
| 2011/0222611 | A1 | 9/2011 | Lindqvist et al. |
| 2011/0235759 | A1 | 9/2011 | Pierrugues et al. |
| 2012/0020418 | A1 | 1/2012 | Sands et al. |
| 2012/0224683 | A1 | 9/2012 | Goodson et al. |
| 2013/0195232 | A1* | 8/2013 | Liang ...................... H04B 1/10 375/346 |
| 2013/0229905 | A1 | 9/2013 | Schenk et al. |
| 2014/0023127 | A1 | 1/2014 | Pereira |
| 2014/0023190 | A1 | 1/2014 | Liang et al. |
| 2014/0185701 | A1 | 7/2014 | Liang et al. |
| 2014/0269947 | A1 | 9/2014 | Schneider |
| 2015/0163350 | A1 | 6/2015 | Shi et al. |
| 2015/0236770 | A1 | 8/2015 | Garrett |
| 2015/0288417 | A1 | 10/2015 | Gomez Moreno |
| 2015/0318875 | A1 | 11/2015 | Kuipers et al. |
| 2015/0327310 | A1 | 11/2015 | Miura |
| 2016/0164621 | A1 | 6/2016 | Tsiaflakis et al. |
| 2017/0026521 | A1 | 1/2017 | Horsley et al. |
| 2017/0085719 | A1 | 3/2017 | Linney et al. |
| 2017/0244446 | A1 | 8/2017 | Al Rawi et al. |
| 2017/0279634 | A1 | 9/2017 | Horsley et al. |
| 2018/0083815 | A1 | 3/2018 | Humphrey et al. |

FOREIGN PATENT DOCUMENTS

| | | |
|---|---|---|
| DE | 102006045901 A1 | 4/2008 |
| EP | 2 091 196 A1 | 8/2009 |
| EP | 2 383 897 A1 | 11/2011 |
| EP | 2429114 A1 | 3/2012 |
| EP | 2538567 A1 | 12/2012 |
| WO | WO 02/25920 A1 | 3/2002 |
| WO | WO-2008005507 A2 | 1/2008 |
| WO | WO 2011/061722 A1 | 5/2011 |
| WO | WO 2013/026479 A1 | 2/2013 |
| WO | WO-2013143604 A1 | 10/2013 |
| WO | WO 2016/050765 A1 | 4/2016 |
| WO | WO 2016/139156 A1 | 9/2016 |
| WO | WO 2016/139254 A1 | 9/2016 |
| WO | WO-2018060259 A1 | 4/2018 |

OTHER PUBLICATIONS

Application and Filing Receipt for U.S. Appl. No. 15/312,264, filed Nov. 18, 2016, 332 pages, Inventors: Linney et al.
Application and Filing Receipt for U.S. Appl. No. 15/504,795, filed Feb. 17, 2017, 1073 pages, Inventors: Horsley et al.
Application and Filing Receipt for U.S. Appl. No. 15/515,403, filed Mar. 29, 2017, 249 pages, Inventors: Al Rawi et al.
Extended European Search Report for Application No. EP16191623. 4, dated Mar. 21, 2017, 7 pages.
Fazlollahi A., et al., "Copper Makes 5G Wireless Access to Indoor Possible," 2015 IEEE Global Communications Conference (GlobeCom), IEEE, Dec. 6, 2015, 5 pages.
International Preliminary Report on Patentability for Application No. PCT/EP2015/072407, dated Apr. 13, 2017, 7 pages.
International Preliminary Report on Patentability for Application No. PCT/EP2017/071667, dated Mar. 14, 2019, 10 pages.
International Preliminary Report on Patentability for Application No. PCT/EP2017/074515, dated Apr. 11, 2019, 8 pages.
International Search Report and Written Opinion for Application No. PCT/EP2015/072407, dated Dec. 18, 2015, 9 pages.
International Search Report and Written Opinion for Application No. PCT/EP2017/071667, dated Oct. 9, 2017, 11 pages.
Riihonen, T., et al., "Large-System Analysis of Rate Regions in Bidirectional Full-Duplex MIMO Link: Suppression versus Cancellation," 47th Annual Conference on Information Sciences and Systems (CISS), IEEE, Mar. 20, 2013, 6 pages.
Tang, et al., "Multiple Users Adaptive Modulation Schemes for MC-CDMA," Global Telecommunications Conference, 2004, Globecom '04, iEEE Dallas, TX, XP010758452, Nov. 29-Dec. 3, 2004, pp. 3823-3827.
International Search Report and Written Opinion for corresponding International Application No. PCT/EP2017/074515 dated Nov. 7, 2017; 10 pages.
Coomans et al.; "XG-FAST: The 5th Generation Broadband"; IEEE Communication Magazine—Communications Standards Supplement; Dec. 2015; 6 pages.
GB Search Report for GB Application No. GB1616591.2, dated Mar. 17, 2017; 6 pages.
Lafata et al.; "Increasing the transmission capacity of digital subscriber lines with phantom circuit and crosstalk cancelation"; published online Nov. 15, 2014; Springer Science+Business Media, New York; 8 pages.
Foubert et al.; "Exploiting the Phantom-Mode Signal in DSL Applications"; IEEE Transactions on Instrumentation and Measurement, vol. 61, No. 4, Apr. 2012; 7 pages.
Karp et al; "*Zero-Forcing Frequency-Domain Equalization for Generalized DMT Transceivers with Insufficient Guard Interval*," by Tanja Karp, Steffen Trautmann, Norbert J. Fliege, EURASIP Journal on Applied Signal Processing 2004:10, 1446-1459; 16 pages.
English Translation of Chinese Office Action, Application No. 201780067106.5, dated Jul. 21, 2020, 9 pages.
Communication pursuant to Article 94(3) EPC for Application No. 17713333.7, dated Jul. 3, 2020, 6 pages.
Extended European Search Report for Application No. 15275058, dated Apr. 22, 2015, 4 pages.
Extended European Search Report for Application No. 16163311.0, dated Oct. 6, 2016, 9 pages.
Final Office Action dated Sep. 1, 2020 for U.S. Appl. No. 16/088,588, filed Sep. 26, 2018, 16 pages.

(56) References Cited

OTHER PUBLICATIONS

Final Office Action dated Nov. 18, 2019 for U.S. Appl. No. 16/088,588, filed Sep. 26, 2018, 13 pages.
International Search Report and Written Opinion for Application No. PCT/EP2016/054167, dated Apr. 21, 2016, 8 pages.
International Search Report and Written Opinion for Application No. PCT/EP2017/057638, dated Apr. 19, 2017, 11 pages.
Mayevskiy., "Measuring Crosstalk in Differential Signals," Nov. 1, 2004, EDN Network, 2 pages.
Moraes R.B., "General Framework and Algorithm for Data Rate Maximization in DSL Networks," IEEE Transactions on Communications, vol. 62, No. 5, May 2014, pp. 1691-1703.
Non-Final Office Action dated Mar. 11, 2020 for U.S. Appl. No. 16/088,588, filed Sep. 26, 2018, 15 pages.
Non-Final Office Action dated May 2, 2019 for U.S. Appl. No. 16/088,588, filed Sep. 26, 2018, 15 pages.
Office Action dated Aug. 4, 2020 for Chinese Application No. 201680013379.7, 7 pages.

\* cited by examiner

METHOD AND APPARATUS FOR TRANSMITTING DATA FROM A TRANSMITTER DEVICE TO ONE OR MORE RECEIVER DEVICES

CROSS-REFERENCE TO RELATED APPLICATION

The present application is a National Phase entry of PCT Application No. PCT/EP2017/074515, filed Sep. 27, 2017, which claims priority from EP Patent Application No. 16191623.4 filed Sep. 29, 2016 each of which is hereby fully incorporated herein by reference.

FIELD

The present disclosure relates to a method and apparatus for transmitting data from a transmitter device to a plurality of receiver devices, and in particular to a method and apparatus for transmitting and receiving data signals over pairs of wires. Such methods include all of the various Digital Subscriber Line (DSL) methods as specified in various International Telecommunications Union (ITU) standards and as being further developed in the ITU at present. Typically each such pair of wires comprises a twisted metallic pair (usually copper) as commonly found within telephone access networks throughout the world.

BACKGROUND

DSL technology takes advantage of the fact that although a legacy twisted metallic pair (which was originally installed to provide merely a Plain Old Telephone Services (POTS) telephony connection) might only have been intended to carry signals using differential mode at frequencies of up to a few Kilohertz, in fact such a line can often reliably carry signals at much greater frequencies. Moreover, the shorter the line, the greater is the range of frequencies over which signals can be reliably transmitted (especially with the use of technologies such as Discrete Multi-Tone (DMT), etc.). Thus as access networks have evolved, telecommunications network providers have expanded their fiber optic infrastructure outwards towards the edges of the access network, making the lengths of the final portion of each connection to an end user subscriber (which is still typically provided by a metallic twisted pair) shorter and shorter giving, rise to correspondingly greater and greater bandwidth potential over the increasingly short twisted metallic pair connections-without having to bear the expense of installing new optic fiber connections to each subscriber. However, a problem with using high frequency signals is that a phenomenon known as crosstalk can cause significant interference reducing the effectiveness of lines to carry high bandwidth signals in situations where there is more than one metallic pair carrying similar high frequency signals in close proximity to one another. In simple terms, the signals from one pair can "leak" onto a nearby line (which may be carrying similar signals) and appear as noise to the other line. Although cross talk is a known problem even at relatively low frequencies, the magnitude of this effect tends to increase with frequency to the extent that at frequencies in excess of a few tens of Megahertz (depending on the length of the lines in question), the indirect coupling (e.g. from a near end of a second line to a remote end of a first line) can be as great as the direct coupling (e.g. from the near end of the first line to the remote end of the first line).

In order to alleviate the problems caused by cross talk (especially Far End Cross Talk or "FEXT" as it is known) a technology known as vectoring has been developed in which knowledge of the signals sent over cross talking lines is used to reduce the effects of the crosstalk. In a typical situation a single DSLAM acts as a co-generator of multiple downstream signals over multiple cross-talking lines and also as a co-receiver of multiple upstream signals from the same multiple cross-talking lines, with each of the lines terminating at a single Customer Premises Equipment (CPE) modem such that no common processing is possible at the CPE ends of the lines. In such a case, downstream signals are pre-distorted to compensate for the expected effects of the cross-talking signals being sent over the neighboring cross-talking lines such that at reception at the CPE devices the received signals are similar to what would have been received had no cross-talking signals been transmitted on the cross-talking lines. Upstream signals on the other hand are post-distorted (or detected in a manner equivalent to their having been post-distorted) after being received at the co-receiver (the DSLAM) in order to account for the effects of the cross-talk which has leaked into the signals during their transmission.

WO2013026479 applied for by Ericsson proposes a method of transmitting signals, in such a situation (i.e. where an indirect coupling is comparable to a direct coupling for a given line), which involves transmitting signals intended for reception by a single CPE device (a first CPE device) onto both the line directly coupled to the first CPE device and onto a crosstalking line coupled only indirectly to the first CPE device (it being directly coupled to a second CPE device). A Time Division Multiplexing (TDM) method is used to enable data to be sent (in different time slots) to the two respective CPE devices (with data being sent over both wires at the same time to only one of the CPE devices at a time). In order to ensure that the two signals constructively interfere at the receiving CPE device, the same signal as sent over one line is pre-distorted (e.g. to introduce a delay and/or phase change) before being sent over the other to account for differences in the directly vs. the indirectly coupled paths.

In addition, transmission mode uniqueness is not guaranteed when multiple conductors are in close proximity. In fact, it has been demonstrated that multi-mode co-existence is inevitable in multi-conductor environments. Intuitively, the average voltage potentials of the pairs at a specific frequency are very unlikely to be equal. Due to this, the voltage potential between pairs starts to move in additional differential circuits formed from multiple pairs in a similar fashion to those in twisted metallic wires pairs. These additional modes/circuits are known as phantom modes. Additionally, it is possible for signals to travel over one or more wires with reference to a fixed common ground (earthed) potential, and such modes are referred to as common modes of transmission. The presence of additional modes, e.g. common/phantom or mixed modes, allows mode conversion continuously coupling signals (often destructively) in each mode. Unlike crosstalk between pairs, signals over mode conversion crosstalk cannot be corrected or controlled without a physical access to these interfering modes. Moreover, it is worth noting that phantom modes propagate over untwisted pairs. Hence, phantoms radiate (cross-couple) higher crosstalk levels than in ordinary pairs (which are twisted). Therefore, the differential mode suffers from energy dissipation under uncontrolled multi-mode channel environment especially at high frequencies.

EP2091196 by Alcatel-Lucent provides a method to inject signals into the phantom mode formed between two Twisted Metallic Pairs (TMPs). The injected signals are the same as those sent onto one of the TMPs, but phase-rotated so that when converted and coupled into the differential mode, they interfere constructively with the signals sent directly over the respective one of the TMPs in the normal differential mode. However, EP2091196 does not consider how to exploit this technique in more general circumstances where there is more than one possible phantom mode available (i.e. where there are more than two TMPs). Furthermore, EP 2091196 does not address any power constraint implications of the arrangement.

Co-pending International Patent Application No. PCT/EP2016/054167, the contents of which are hereby incorporated into the present application, describes an improvement over the above described approaches in which a phantom channel connector device is used to enable any set of up to (n−1) possible phantom channels, associated with a set of n pairs of wires, to be selected such as to enable desired transmission signals to be connected onto those phantom channels. In particular, if there are n pairs of wires, in general it is possible to select up to $$\binom{n}{2}$$

possible first order phantoms (i.e the phantom between pair 1 and pan 2, the phantom between pair 1 and pair 3, the phantom between pair 1 and pair n, the phantom between pair 2 and pair 3, the phantom between pair 2 and pair 4, the phantom between pair 2 and pair n, the phantom between pair 3 and pair 4, the phantom between pair n−1 and pair n), even though only $$\lfloor \tfrac{n}{2} \rfloor$$

mutually orthogonal, first order phantom channels out of these can be chosen so that all $$\lfloor \tfrac{n}{2} \rfloor$$

selected phantoms are mutually orthogonal to each other Thus for example if there are 8 pairs, there exist 28 different ordinary first order phantom modes but only up to 4 can be chosen which are all mutually orthogonal to one another. For this reason, in PCT/EP2016/054167, the phantom channel connector provides $$\lfloor \tfrac{n}{2} \rfloor$$

inputs and includes a controllable switching mechanism for connecting the $$\lfloor \tfrac{n}{2} \rfloor$$

inputs to a selected set of $$\lfloor \tfrac{n}{2} \rfloor$$

phantoms selected from the possible $$\binom{n}{2}$$

ordinary first order phantom channels. The selection of the phantom channels to be connected is controlled with a phantom channel selection signal issued by a suitable controller. The phantom channel connector device is an analogue device operating in the time domain and cannot therefore distinguish between (or operate differently in respect of) different tones. In some embodiments of the disclosure of PCT/EP2016/054167, the selection signal is constructed so as to select a mutually orthogonal subset of the possible $$\binom{n}{2}$$

ordinary first order phantoms so as to minimize interference between signals carried over the selected phantoms

SUMMARY

According to a first aspect of the present disclosure, there is provided a method of transmitting data from a transmitter device to a plurality of receiver devices, each of which is connected to the transmitter device via at least one respective pair of wires, each receiver device being operable to receive signals detected as a change over time in the potential difference across the local ends of each respective pair of wires extending between the receiver and the transmitter device, the transmitter device being operable to transmit signals onto the wires extending between the transmitter device and the plurality of receiver devices in a plurality of different modes, over a plurality of different channels, the different modes including phantom and differential modes and the different channels including a first set of phantom channels, the method comprising selecting a second set of phantom channels from the first set, the second set being a proper subset of the first set comprising one or some of the phantom channels of the first set (but not all the phantom channels of the first set), the selection being made in dependence upon the cross-talk coupling between the phantom channels of the first set and the reception of signals at each of the receivers detected as a change over time in the potential difference across the local ends of the (or each) respective pair of wires extending between the respective receiver and the transmitter device, connecting the selected phantom channels to the transmitter and transmitting signals from the transmitter onto the (thus selected and connected) phantom channels of the second set of phantom channels.

In some embodiments the method further comprises performing additional steps to compensate for the resulting interference effects caused by the use of non-mutually orthogonal phantom channels. Thus in one embodiment, the method further comprises, in respect of each of a plurality of different tones employed by the transmitter, which is using a DMT technique, selecting a tertiary set of phantom channels, each tertiary set being a proper subset of the second set (comprising some but not all of the second set) and being selected so as to be mutually orthogonal to each other, generating in a digital frequency domain a set of signals including at least one signal for each phantom channel m the second set of phantom channels, wherein for each respective tone, data is encoded only into phantom channels in the respective tertiary set of phantom channels for that tone, with signals associated with phantom channels not in the respective tertiary subset being set to a low-interference-causing value for that tone.

In this way different phantom channels can be exploited at different tones on a tone by tone basis achieving extended diversity and enabling different levels of cross talk coupling at different frequencies to be efficiently exploited. A low-interference-causing value may simply be a zeroed value (i.e. one with zero or very small magnitude in the normal case where the modulating value is expressed as a complex number having a magnitude and phase) or alternatively, it may be chosen to be one which matches another phantom channel with which it strongly cross-talks so as to interfere constructively or partially constructively with the other phantom channel (being one which is in the tertiary subset for that tone).

As a simple concrete example in order to illustrate the above, consider a system with 4 pairs (pairs 1-4) Each of these is driven in a differential mode In addition, a phantom channel connector device provides access to 4 first order phantom channels, pc12, pc34, pc13 and pc24, being a phantom channel formed between pairs 1 and 2, a phantom channel between pairs 3 and 4, a phantom channel between pairs 1 and 3 and a phantom channel between pairs 2 and 4 Note that only two phantom channels can be selected from these four to form a mutually orthogonal subset, and there are only two different possible subsets of two phantom channels which contain mutually orthogonal channels, namely either pc12 and pc34 or pc13 and pc24 Thus for example pc12 and pc13 are not mutually orthogonal and neither are say pc12 and pc24, etc. According to the terminology employed above, pc12, pc34, pc13 and pc24 constitute both the first set and second set pc12 and pc34 constitute a first tertiary subset and pc13 and pc24 constitute a second tertiary subset. For some tones the first tertiary subset is selected and signals transmitted over pc12 and pc34 carry data, whilst signals over channels pc13 and pc24 are set to a low-interference-causing signal/value, in other tones the second tertiary subset is selected and data is encoded into signals transmitted over pc13 and pc24 whilst low-interference-causing signals are transmitted over pc12 and pc34. The selection of which tertiary subset to select and use for each tone can be made based on an assessment of the extent of crosstalk to/from each of the possible phantom channels at the frequency associated with each tone.

It will be apparent to the skilled reader that where it says "operable to receive" signals at each of the receivers detected as a change over time in the potential difference across the local ends of the (or each) respective pair of wires extending between the respective receiver and the "transmitter" it is clearly conveying the idea that the signals are received at each receiver in the normal differential mode. Although the first aspect of the disclosure does not exclude the possibility that the determination of which phantom channels to employ is based upon other more complex considerations (in addition to the simpler consideration of the crosstalk coupling strengths between the various possible phantom channels and the various differential mode channels as detected at the receivers), by basing the analysis at least upon this latter type of coupling, it is possible for conventional receivers', which are only capable of receiving signals via the differential mode in respect of a single twisted metallic pair, to be used in the first aspect of the disclosure. This is important because it means that all of the complex functionality for implementing certain embodiments of the disclosure can reside m the access network (e gat an Access Network Node (ANN) or Digital Subscriber Line Access Multiplexor (DSLAM), etc) rather than requiring any special Customer Premises Equipment (CPE), in certain embodiments of the disclosure.

In certain simple embodiments, a special training procedure m which signals are transmitted into only a single phantom channel (at any one time) for a given set of receivers (the given set of receivers being typically chosen based on some assessment of their likelihood to crosstalk interfere with one another at frequencies of interest for DSL (including G FAST) communications with one another—i.e. frequencies which the transmitter and receiver are capable of using successfully and which the transmitter and receiver (or at least one or some of the given set of receivers) are permitted to use under local regulations). Each receiver can then measure properties of the received training signals and feed these back to the transmitter in the normal manner to thus obtain information about the crosstalk coupling between the single used phantom channel on which the training signals were transmitted and each of the normal differential mode channels as detected at each respective receiver. By repeating this training procedure multiple times using different single phantom mode channels it is possible to obtain comprehensive information about the crosstalk coupling between each such phantom mode channel and each direct differential mode channel terminating at the receivers of the given set of receivers. This information can then be used to assist in the appropriate selection of which phantom mode channels to use during "showtime" operation of the transmitter and receivers during normal DSL communications.

Throughout this specification reference will be made to modes of communication. In this specification the term "mode" is used to indicate the nature of the manner in which signals are transmitted between transmitter and receiver In particular, as will be appreciated by persons skilled in the art, there are three principal such modes of communication differential mode, phantom mode and common mode. In all three of these modes the signal is transmitted (excited) and received (observed) as the (changing) potential difference (voltage differential) between two voltages (or equivalently between one "live" voltage and one "reference" voltage) In the differential mode the signal is transmitted/observed as the difference in potential between two wires (typically between two wires of a twisted metallic pair). In the phantom mode at least one of the voltages is the average voltage of a pair of wires (note that such average can vary without impacting on a signal carried in the differential mode across that same pair of wires in this sense the phantom mode can be orthogonal to signals carried in the differential mode if carefully chosen), the term pure phantom mode may be used to specify that both voltages being compared with each other are average voltages, each average voltage being the average or common voltage of at least one pair of wires. Second and higher order phantom modes can also be obtained by using the average voltage of two or more average voltages as one of the voltages to be compared, etc. Finally, the common mode refers to the case where one of the voltages being compared is the "Earth" or ground reference voltage (or something substantially similar for telecommunications purposes). Naturally, it is possible for various mixed modes to also be used for carrying signals—e.g. one reference voltage could be a common ground and the other could be the average between the voltages of two wires in a twisted metallic pair (to generate a mixed mode of phantom and common modes)—however, in general, reference to a differential mode in this specification is used to refer to a pure differential mode—i.e. it does not include any phantom or common mode component so a mode comprising a comparison between the voltage on a single wire and the average voltage between the voltages of two other wires may be referred to as an impure phantom mode rather than a mixed phantom and differential mode, etc. Embodiments of the present disclosure invention are primarily concerned with the intelligent usage of pure phantom modes, and so in general reference to a phantom mode will mean such a pure phantom mode be it first or second or higher order etc unless explicitly specified otherwise.

Reference is also made throughout this specification to direct and indirect coupling and direct and indirect channels. A direct channel is one in which the same physical medium and the same mode of transmission is used for both the transmission of the signal and for the reception of the signal. Thus a normal differential mode transmission across a single twisted metallic pair from transmitter to receiver would constitute a direct (differential mode) channel between the transmitter and the receiver. By contrast, a channel in which the transmitter transmitted a signal onto a second twisted metallic pair m differential mode but was received by a receiver from a first twisted metallic pair in differential mode (the signal having "crosstalked" across from the second to the first pair) is an example of an indirect channel, as is a case in which a signal is transmitted by a transmitter m a phantom mode across the averages of the voltages of the wires in each of a first and second TMP and received (having "crosstalked/mode" converted) by a receiver connected to just the first TMP in differential mode.

Moreover, where there are multiple pairs emanating from a single transmitter (e.g. an Access Node (AN) or DSLAM, etc.) in such a way that multiple direct and indirect channels are formed between the transmitter and multiple receivers, the set of twisted metallic channel pairs and their derivative channels (direct and indirect and of various different modes) can be considered as forming a "untied" dynamic shared or composite channel over which a number of virtual channels may be overlaid (i e the virtual channels are overlaid over the underlying common shared channel). In this context, a virtual channel can be considered as an overlay channel by which data can be directed to individual receivers even though a single common underlying signal is transmitted onto the underlying common channel, this can be achieved for example by means of a suitable multiple access technique such as Frequency Division Multiple Access (FDMA), Code Division Multiple Access (COMA), Time Division Multiple Access (TDMA) or simply be using suitable encryption techniques, etc. It is interesting to observe, however, that this "common" shared channel is comprised of several different sub-channels which combine together at each receiver/transmitter device (for example a single direct path channel over a twisted metallic pair directly connecting the transmitter to the respective receiver, and one or more indirect, cross-talk paths (possibly also involving mode conversions) of both the differential and the phantom modes from the transmitter to the receiver via at least one twisted metallic pair which is connected between the transmitter and another of the receivers). For this reason, the dynamic "unified" shared channel is henceforth termed a composite channel comprising a composition of single-mode direct/indirect couplings/sub-channels and mixed-mode indirect couplings/sub-channels.

European Patent Application No. 14 250 116 2 filed by the present applicant on 30 Sep. 2014, the contents of which are hereby incorporated, by way of reference, into the present application in their entirety, describes a technique for efficiently exploiting such a common unified channel using virtual overlay channels. Some embodiments of the present disclosure invention combine the teachings of the present application with the teachings of the earlier application In particular, the techniques of the second aspect of the present disclosure are utilized to determine which phantom mode channels to use and then these are used together with other channels to form a common unified channel (including the selected phantom modes) over which a single common signal is transmitted with a suitable multiple access technique being used to provide overlaid virtual channels.

This composite channel (generally) consists of at least two modes differential and phantom modes. In special scenarios, the common mode can be harnessed and treated in a similar fashion to form additional sub-channels. In the differential mode, the twisted pairs are made of differential electrical circuits to enable the direct physical link between a transmitter (DPU/DSLAM) and a receiver modem The co-existence of multiple twisted pairs in the binder ignites mutual coupling which results in immediate and continuous energy dissipation from one pair into others.

Phantom channels can be constructed from different combinations of twisted pairs. For instance, a first and a second TMP can together generate a single unique phantom channel which has a similar behavior to that of each directly coupled differential mode channel formed across each pair in terms of channel directivity. However, phantom modes, as mentioned earlier, are due to the variation of the average voltages of the pairs. For more than two coupled pairs, the pairs may couple to each other in the phantom mode in various orthogonal and non-orthogonal manners, e.g. 2 distinct (but non-orthogonal) phantom mode channels may be exploited which share one common pair. Some embodiments of the disclosure select and construct only orthogonal phantom channels. This minimizes complex interference effects between the lines whilst still providing significant improvements to the lines being targeted for improvement, Embodiments of the present disclosure are based on modeling (so that it can also be solved) the problem of phantom selection and connection to a transmitter (which combined process may hereinafter be referred to as phantom construction) as a multi-objective optimization problem (hereinafter referred to as PC-1VIOP standing for Phantom Construction Multi-objective Optimization Problem). The target of this optimization problem is to obtain an optimal (or at least good) set of orthogonal phantom combinations to maximize the mode conversion crosstalk onto all pairs. Moreover, embodiments of the present disclosure permit such selection of which phantoms to use (and to operatively connect to the transmitter) to be performed on a tone by tone (or group of tones by group of tones) basis. In some preferred embodiments, a Pareto method is employed to determine the Pareto front which contains the best (or at least good or close to the best) phantom tree access strategy The optimization problem can also be biased or weighted to benefit a specific pair, e.g. worst pairs In DSL environments, the Pareto front can be calculated only once (or at least relatively infrequently) since the channel behavior is considered stationery (or almost stationary) Once the phantom channels have been selected, an analysis can be performed to determine an exploitation strategy in time, frequency and space which achieves a certain predetermined objective which, in one embodiment, may include (or consist of) maintaining fairness constraints between active users. This approach is advantageous because it gives the network operator a degree of flexibility over how to improve the performance of certain lines (e g to improve lines operating relatively poorly with high errors or high latency or low data rates, etc, or to accommodate surges in demand from certain users, etc).

Single mode crosstalk exploitation (e g from TMP 2 differential mode (at transmitter 2) to TMP 1 differential mode at receiver 1) is less complex than exploiting a phantom mode to differential mode indirect channel because the single mode crosstalk channels do not need to be constructed m the way that phantom mode channels must be. The fundamental issue with single mode crosstalk channels (e g. from TMP2 to TMP1) is that once a differential mode crosstalk channel is occupied for data transmission at a specific spectrum, e g. vectored spectrum, the user associated with the direct path of that crosstalk channel (e g user 2 at the receiver end of TMP2) becomes inactive, meaning that the vectored spectrum is neglected (even though it might in fact be in demand). Therefore crosstalk channel allocation can be carried out in a time/frequency division multiple access (F/TDMA) fashion when lines are not in use as in WO2013026479. In certain embodiments of the present disclosure however, the crosstalk transmission knowledge is capable of being exploited in multiple different ways, depending upon circumstances and the desired outcome, using techniques such as the prior art techniques known from WO0213026479 in addition to the techniques taught in the present specification. For example crosstalk channels can be exploited at some frequencies using a TDMA approach whilst at other frequencies a Code Division Multiple Access (COMA) technique could be employed instead. Moreover, the frequencies at which such different techniques are employed can also be changed over time to suit differing requirements, etc. This provides great flexibility to the system and gives the ability to network operators to dynamically adjust the properties of connections to respond to changes in demand or external noise environments etc.

In addition, some embodiments of the disclosure employ a method to share a crosstalk channel spatially to benefit multiple (or all) active lines (crosstalk coupled to each other) at a given frequency, simultaneously. This may be done by employing the phantom optimization framework for crosstalk channels except that phantom channels are allowed to be exploited over any frequency without any restriction while crosstalk channels are only exploited in the diversity region of the channel above a critical frequency (at which it becomes more efficient to use methods such as those described in EP 14 250 116 2 referred to above by which the connections between transmitter and receivers are treated as a single common unified channel) except for unused/inactive lines (which are exploited without restriction in the same way as phantom mode channels). Therefore, some embodiments of the disclosure provide a complete utilization framework for indirect channels over distinct different spectrum regions, i.e. vectored, crosstalk and phantom mode transmissions, to enable simultaneous dynamic access. (Also note that direct paths may also be optimized in some embodiments of the present disclosure.) This approach again provides great flexibility of the system to the network operator to adjust the operation of the lines to account for changes m demand or changes in the noise environment within which the system is operating, etc.

Further aspects of the disclosure relate to a transmitter for carrying out the method of the first aspect of the disclosure. In particular, a second aspect of the present provides a transmitter for transmitting data, using a DMT technique, to one or more receiver devices, each of which is connected to the transmitter device via at least one respective pair of wires, each receiver device being operable to receive signals detected as a change over time in the potential difference across the local ends of each respective pair of wires extending between the receiver and the transmitter device, the transmitter device being operable to transmit signals onto the wires extending between the transmitter device and the plurality of receiver devices m a plurality of different modes, over a plurality of different channels, the different modes including phantom and differential modes and the different channels including a first set of phantom channels, the transmitter being further operable to select a second set of phantom channels from the first set, the second set being a subset of the first set comprising some or all of the phantom channels of the first set such that at least some of the phantom channels in the second set are not mutually orthogonal to one another, the transmitter further comprising a connector for connecting the selected phantom channels of the second set to the transmitter, and the transmitter being further operable to transmit signals from the transmitter onto the (thus selected and connected) phantom channels of the second set of phantom channels.

In some embodiments, the transmitter is further operable (according to the second aspect), in respect of each of a plurality of different tones employed by the transmitter to select a plurality of tertiary sets of phantom channels, each tertiary set being a proper subset of the second set (comprising some but not all of the second set) and being selected so as to comprise phantom channels which are mutually orthogonal to each other, the transmitter being further operable to generate, in a digital frequency domain, a set of signals including at least one signal for each phantom channel in the second set of phantom channels, wherein, for each respective tone, data is encoded into signals for transmission over the phantom channels in the respective tertiary set of phantom channels for that tone and signals associated with phantom channels not in the respective tertiary subset being set to a low-interference-causing value for that tone.

It should be noted that the described embodiments are couched in terms of the downstream direction of data only (i.e. from an Access Node/DSLAM to Customer Premises Equipment (CPE) devices)—e g. by referring to a transmitter rather than a transceiver, etc However, in a practical implementation the "transmitter" of the second aspect of the present invention also, naturally, functions as a receiver for upstream transmissions from the various CPE devices (which are also therefore in practice operating as transceivers rather than just receivers). However, present embodiments of the disclosure may operate in an entirely conventional manner in the upstream direction and not exploit phantom channels in the transmission or reception of upstream signals. Further embodiments, however, relate to situations in which a point to point architecture is involved in which two transceiver devices are connected to each other via multiple twisted metallic pairs with multiple analogue front end units for driving signals over the respective TMPs.

A third aspect of the present disclosure relates to a phantom channel connector for connecting a transmitter device to a selected set of phantom channels carried over a plurality of pairs of wires extending between the transmitter and a plurality of receiver devices, the phantom channel connector comprising, a phantom channel selection signal receiver for receiving a phantom channel selection signal specifying a set of one or more selected phantom channels, the set of selected phantom channels comprising a subset of the total number of possible phantom channels to which the connector is operable to connect to the transmitter and including at least some phantom channels which are not mutually orthogonal to one another, a switch arrangement comprising a plurality of pairs of input terminals, each pair of input terminals being operable to receive a transmission signal for transmission over an associated selected phantom channel and a plurality of output terminals, and a plurality of phantom mode driving couplers for applying a voltage output from the switching arrangement to a pair of wires in a manner suitable for driving a component voltage of a phantom mode signal over the pair of wires, wherein the switching arrangement is operable to selectively couple each input terminal to any one of the output terminals in dependence upon the received phantom channel selection signal such that, in use, a transmission signal applied to a pair of input terminals is capable of being transmitted over a selected phantom channel in dependence upon the received phantom channel selection signal, and wherein the switching arrangement comprises more input terminals than output terminals.

By having more input terminals than output terminals it is possible to simultaneously receive more input signals than can be connected to mutually orthogonal first order phantom channels. It will be seen from a brief glance at FIGS. 3 and 4 (discussed in detail below) that the switching arrangements of embodiments of the present invention are wider than they are tall as a result of this property (of having more input than output terminals) of the switching arrangement (since inputs arrive along the longer bottom edge whilst outputs leave across the shorter left-hand edge). The output terminals of the embodiments shown in FIGS. 3 and 4 can be considered to be any part of the horizontal lines to the left of the switches in the figures and the input terminals of the switches can be considered to be any part of the vertical lines below the switches (one may consider the portions above the transformers to be the input terminals of the switch arrangement and the portions below the transformers to be input terminals to the MPAD arrangement, the MPAD arrangement providing transformers—according to the preferred embodiments of FIGS. 3 and 4—to couple the MPAD inputs to the switch inputs in a safe and clean manner, the input terminals being arranged in pairs for receiving differential signals across the input terminals of a pair of terminals).

The phantom channel connector of the third aspect of the present invention not only permits a selected phantom channel or channels to be exploited for the benefit a particular CPE device or devices, additionally, it allows different such phantom channels to be selected quickly and easily based on a received phantom channel selection signal. This not only assists in selecting an appropriate phantom channel to use many particular given circumstance, but also enables phantom channels to be selected individually for training purposes as well as in sets for use once training has completed, etc.

In some embodiments disclose the driving couplers comprise center tap connections to an inductor or transformer connected to a pair of wires at the transmitter end of the wires. This provides a simple and robust manner of accessing the phantom channels.

A fourth aspect of the present disclosure relates to a phantom channel selector device, forming part of a transmitter device, the phantom channel selector device being operable to select a plurality of phantom channels carried over a plurality of pairs of wires extending between the transmitter and a plurality of receiver devices on to which to transmit a transmission signal or signals, the phantom channel selector device comprising: a coupling data receiver for receiving receiver signal reception data and/or cross channel coupling data, a selection interface for communicating a phantom channel selection signal and/or message to a phantom channel connector (such as the phantom channel connector according to the third aspect of the present disclosure), and a processor arranged to generate a phantom channel selection, for selecting a second subset of phantom channels, the second subset comprising some or all of the total number of phantom channels which the phantom channel connector is operable to connect to and including at least some phantom channels which are not mutually orthogonal to one another, for communication to the phantom channel connector within the phantom channel selection signal and/or message, in dependence upon the received signal reception data and/or cross channel coupling data. In some embodiments, the processor is further operable to additionally select a plurality of tertiary subsets of phantom channels, each tertiary subset comprising a proper subset of the second subset (comprising some but not all of the phantom channels in the second subset) wherein all of the phantom channels in each tertiary subset are mutually orthogonal to one another. In some embodiments, the phantom channel selector device further comprises a multi-objective problem processing unit for performing a determination of which phantom channels to select (either for the second subset or for each tertiary subset, or for all such subsets) as the solution of a multi-objective problem in which a solution is sought to simultaneously benefit two or more of the receivers.

In all these aspects, orthogonal means theoretically orthogonal, it being understood that in practice no real phantom channels will ever be perfectly orthogonal to one another because of natural imperfections, but for the purposes of the present invention such imperfections are reasonably ignored In particular, if the phantom channels do not use a single common wire or pair of wires then they will be considered to be mutually orthogonal to one another.

Further aspects of the present disclosure relate to processor implementable instructions for causing a processor to carry out the method of the first aspect of the present invention and/or for causing a processor to operate as a phantom channel selector device in accordance with the fourth aspect of the present invention, aspects of the invention also relate to carrier media, preferably non-transient, tangible media such as volatile or non-volatile solid state storage media (e g USB thumb drives etc), magnetic storage media such as a hard drive, or optical storage media such as a CD or DVD, etc., carrying such processor implementable instructions as mentioned above.

In some embodiments, m which a transmitter device is connected to a first and a second receiver device (the receiver devices being connected to the transmitter device via a first and a second pair of wires respectively, and each receiver device being operable to receive signals detected as a change over time in the potential difference across the local ends of each respective pair of wires extending between the receiver and the transmitter device), the transmitter device may preferably be operable to transmit signals onto the wires extending between the transceiver device and the receiver devices in order to transmit signals via the direct differential mode to each respective receiver, and to additionally be operable to transmit signals to both receivers via a single common phantom channel, wherein the transmitter is further operable to measure the extent of coupling between the phantom channel and each of the receiver devices, to determine a plurality of weighting values m dependence upon the measured extent of the couplings, to transmit a first signal via the direct differential mode over the first pair and a second signal via the direct differential mode over the second pair and to transmit a combined signal onto the indirect phantom channel, the combined signal comprising a weighted sum of the first and second signals, the weighting being done in accordance with the determined weighting values In this way, it is possible for a single common indirect channel to be used to benefit both receivers simultaneously by using weighting values between 1 and 0. It is also possible to use different weighting values for different tones. In this way the different extent of the couplings at different frequencies can be taken into account and exploited to maximize the total benefit to the two receivers (e.g. for tones where a stronger coupling is in place for the first receiver compared to the second a bigger weighting can be given to the first signal (possibly even a weighting of 1—implying that the signal for such tones is composed entirely of the first signal) whilst for tones where the coupling is stronger with the second receiver the weightings can be reversed to give a greater weighting to the second signal, etc.). Moreover, the weighting can be determined in order to satisfy a number of different objectives—e.g to provide greater assistance to a poorly performing line, or to maximize the total performance of both lines in combination, etc.

In some embodiments, the weighting values are additionally determined m dependence upon the instantaneous level of demand for data to be transmitted to a respective receiver It is most preferred if the transmitter) devices and the receiver devices are operating in accordance with a physical layer retransmission scheme whereby a receiver requests retransmission of received data which is irreparably damaged because of errors in the received signals/detected/recovered data upon receipt In such a case, it is preferred if the demand used in determining the weighting values reflects the demand for physical layer re-transmission of data caused by errors in transmitting use data. In this way, higher layers (e g. data link, network, transport, application layer protocols) can be offered higher consistent data rates with less overhead (and less potential buffering) required for physical layer retransmissions (to be built into the offered consistent rate to higher layers) because the bandwidth needed for these physical layer retransmissions can be allocated from the extra capacity associated with the use of the phantom cross-talk path on an on-demand basis.

In some embodiments the weighting values are re-determined on a relatively frequent basis such as of the order of between once every few seconds to several times per second. This enables changes in demand for bandwidth for the transmission of data to the different receivers to be accommodate in a short period of time and consequently enables buffers at the transmitter associated with retransmission protocols to be cleared as quickly as possible.

In some embodiments, the weighting values are used not only to affect the signal which is transmitted onto the phantom channel, but are also used to affect the first and second signals since the extent of preceding required to accommodate distortion caused by cross-talk varies in dependence upon these weighting values. In other words, in some embodiments the first signal is generated in dependence upon (at least) user data to be transmitted to the first receiver, channel estimations of the respective direct channel between the transmitter and the first receiver, channel estimations of the indirect channel between the direct channel between the transmitter and the second receiver on the one hand and the first receiver on the other hand, channel estimations between the common indirect channel on the one hand and the first receiver on the other hand, and on the determined weighting values. The second signal is preferably similarly dependent upon corresponding factors mutatis mutandis.

Some brief discussion of what is meant by a common indirect channel may be useful. As per embodiments described below, this can include an unterminated phantom channel formed across center tap voltages of two different twisted metallic pairs. Since this channel is unterminated (since it is not possible to measure and co-process the center tap voltages of the respective TMP's at the customer premises ends receivers in general (since in general these will be in quite distinct geographical locations)) the "common" channel is m fact only common for part of the channel since it terminates at different locations for the different receivers, nonetheless it is common in the sense that at least one end of the channel is common between different receivers and the same (combined) signal is propagated onto that common part of the channel. Moreover, in general, where it states above (and elsewhere in the present description) that a channel is between a first channel and a second channel, what is actually meant of course is the channel between the transmission from the transmitter onto the transmitter end of the first channel and the reception at the receiver at the receiver end of the second channel, and similarly where reference is made to a channel between a first channel and a receiver what is actually meant is the channel from the transmitter via the transmitter end of the first channel to the receiver, etc.

The method can of course be extended to more than two receivers where there is a common, indirect channel which cross-couples onto all of the respective lines. Additionally, the method can be used such that say receivers one and two benefit simultaneously from a common transmission over a first indirect channel and receivers two and three benefit simultaneously from a transmission over a second indirect channel, such that the second receiver benefits simultaneously from two separate indirect channels, etc. Other manners of using embodiments of this fifth aspect of the present invention will occur to persons skilled in the art based on the above examples.

BRIEF DESCRIPTION OF THE DRAWINGS

In order that the present disclosure may be better understood, embodiments thereof will now be described with reference to the accompanying drawings in which.

DESCRIPTION OF EMBODIMENTS

Figure 1:
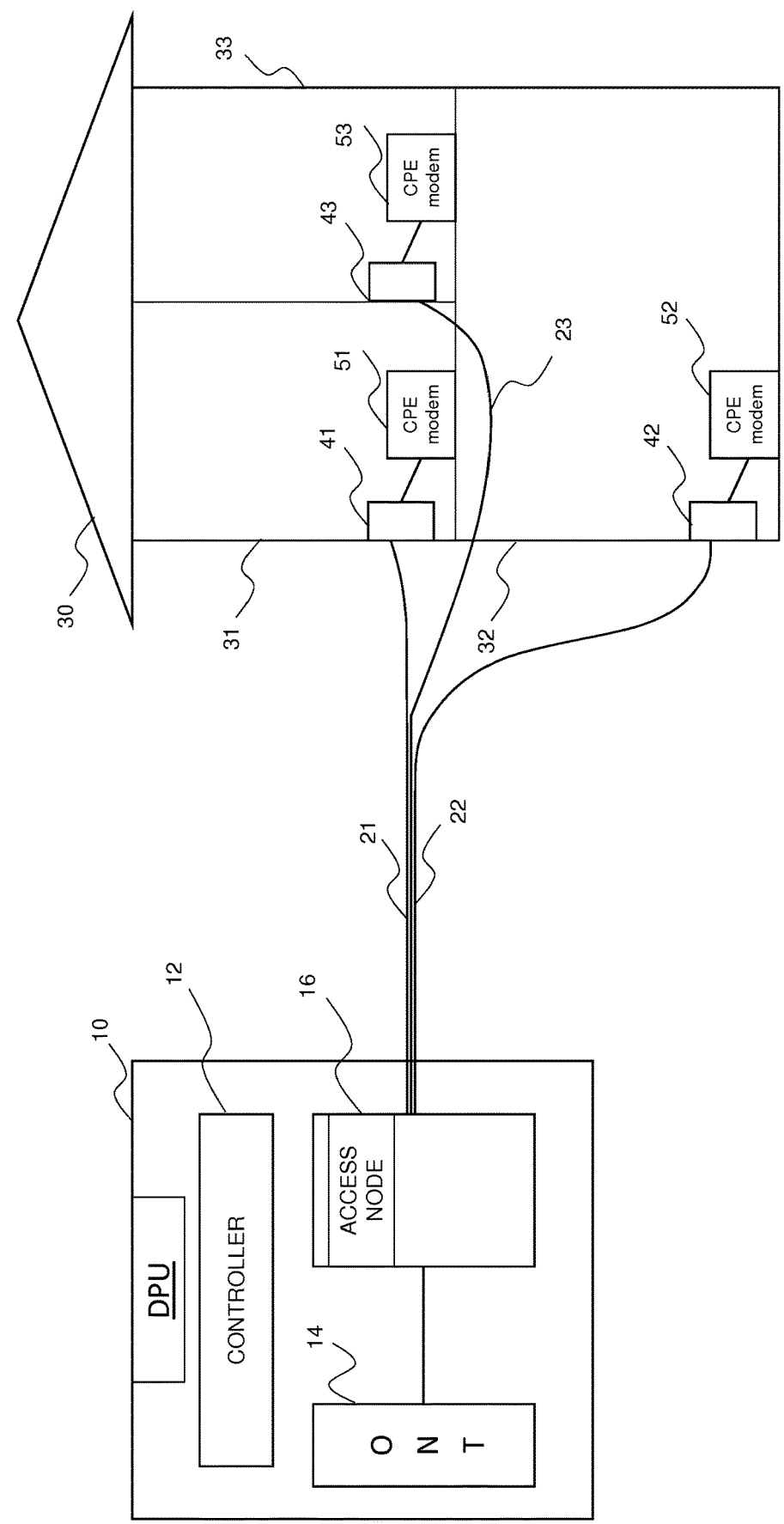
FIG. 1 is a schematic illustration of an example broadband connection deployment showing a Distribution Point Unit (DPU) and two customer premises having associated Customer Premises Equipment (CPE) modems connected to the DPU via respective Twisted Metallic Paii (TMP) connections.

FIG. 1 illustrates in overview an example broadband deployment in which embodiments of the present disclosure could be employed. As shown m FIG. 1, the example deployment comprises a Distribution Point Unit (DPU) 10 which is connected to three user premises 31,32, 33 (which m this example are flats with a single house 30) via respective Twisted Metallic Pair (TMP) connections 21, 22, 23 which connect between an Access Node (AN) 16 (e.g. a Digital Subscriber Line Access Multiplexor (DSLAM)) within the DPU 10 and respective Customer Premises Equipment (CPE) modems 51, 52 via respective network termination points 41, 42 within the respective customer premises 31, 32. The DPU 10 additionally includes an Optical Network Termination (ONT) device 14 which provides a backhaul connection from the DPU 10 to a local exchange building via an optical fiber connection such as a Passive Optic-Fiber Network (PON) and a controller 12 which coordinates communications between the AN 16 and the ONT 14 and which may perform some management functions such as communicating with a remote Persistent Management Agent (PMA).

As will be apparent to a person skilled in the art, the illustrated deployment involving an optical fiber backhaul connection from a distribution point and a twisted metallic pair connection from the distribution point to the "customers" premises is exactly the sort of deployment for which the G.FAST standard is intended to be applicable In such a situation, the TMP connections may be as short as a few hundred meters or less, for example possibly a few tens of meters only and because of this it is possible to use very high frequency signals (e.g. up to a few hundred Megahertz) to communicate over the short TMP's because the attenuation of high frequency signals is insufficient to prevent them from carrying useful information because of the shortness of the lines. However, at such high frequencies cross-talk becomes a significant issue. This is clearly especially going to be the case where the cross-talking lines travel alongside each other for part of their extent (as in the situation illustrated in FIG. 1), however, cross-talk is still an issue at high frequencies (e g over 80 MHz) even where the lines only lie close to one another for a very small portion of their total extent (e.g. just when exiting the DPU 10) G FAST currently proposes simply using vectoring techniques at all frequencies where there are cross-talking lines in order to mitigate against the cross-talk effects.

In addition, in this scenario, by accessing at the DPU 10 (in particular at the Access Node (AN) 16) phantom channels, it is possible to exploit signals transmitted onto phantom channels which will "crosstalk" onto the conventional differential mode channels associated with each of the end user receivers (the termination point and CPE modem combinations 41/51, 42/52, 43/53) and change the signals received (compared to a conventional case where the phantom channels are not exploited in this way). Since there are three TMP connections 21-23, there are 3 possible (first order, pure) phantom channels which could be exploited in this way, formed by using the differential voltage signal between the average voltage of TMP 21 and that of TMP 22, the average voltage of TMP 21 and that of TMP 23; and the average of TMP 22 and that of TMP 23. However, since there is no possible set of two of these possible (first order, pure) phantom channels which does not include at least one common TMP, only one of these can be used at the same time without having non-orthogonal (and hence complexly interfering) phantom channels being used simultaneously Thus the present embodiment includes a Phantom Channel—Multiple Optimization Problem device (PC-MOP) which, as is explained in greater detail below, acts to choose a single one out of the three possible phantom channels to use—the selection being performed such as to try to achieve a particular set of two (or more) objectives (e g to try to obtain the maximum benefit for two of the three receivers).

Figure 2:
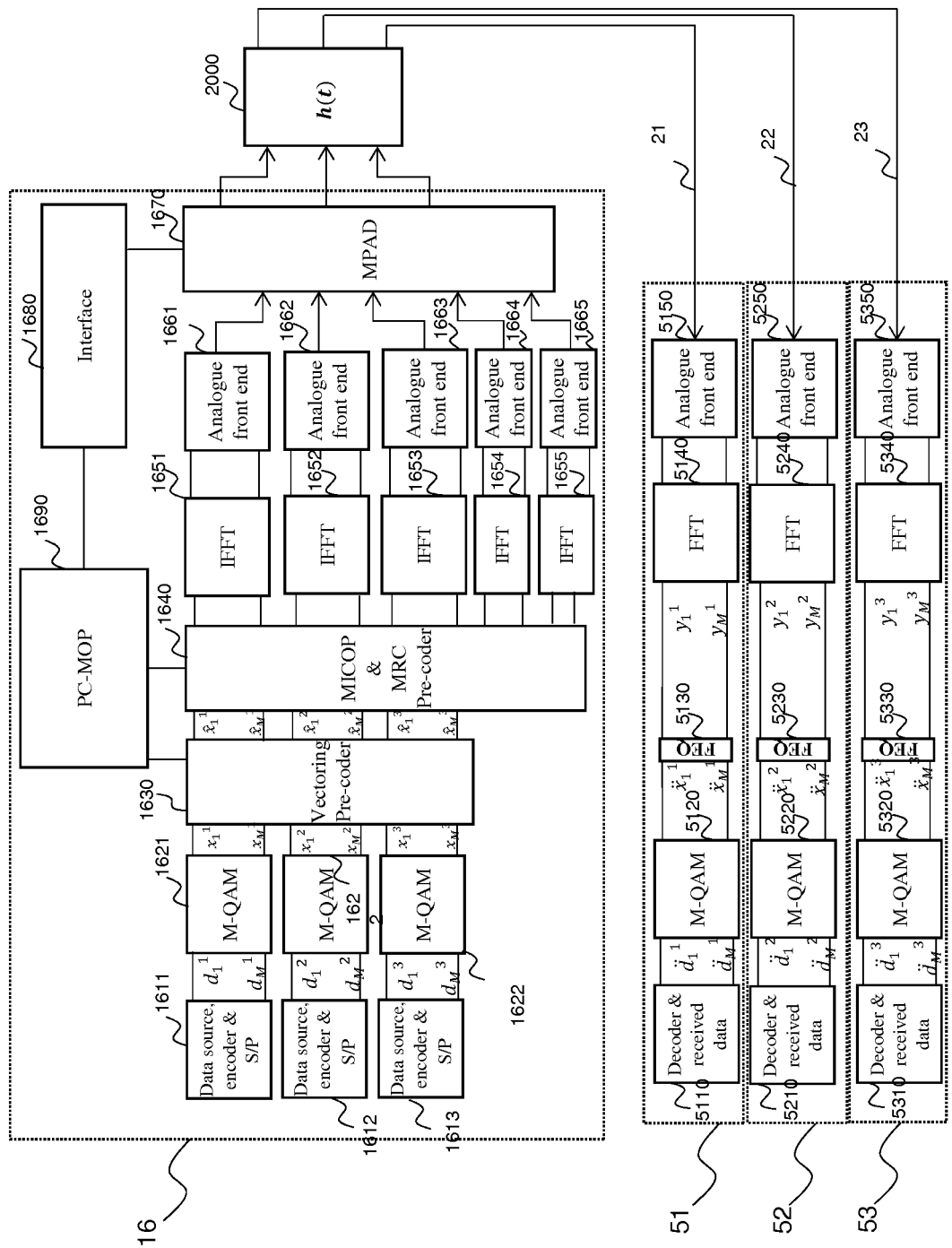
FIG. 2 is a schematic block diagram illustrating the principal components in a modem to modem connection operating in accordance with a first embodiment of the present disclosure.
Figure 3:
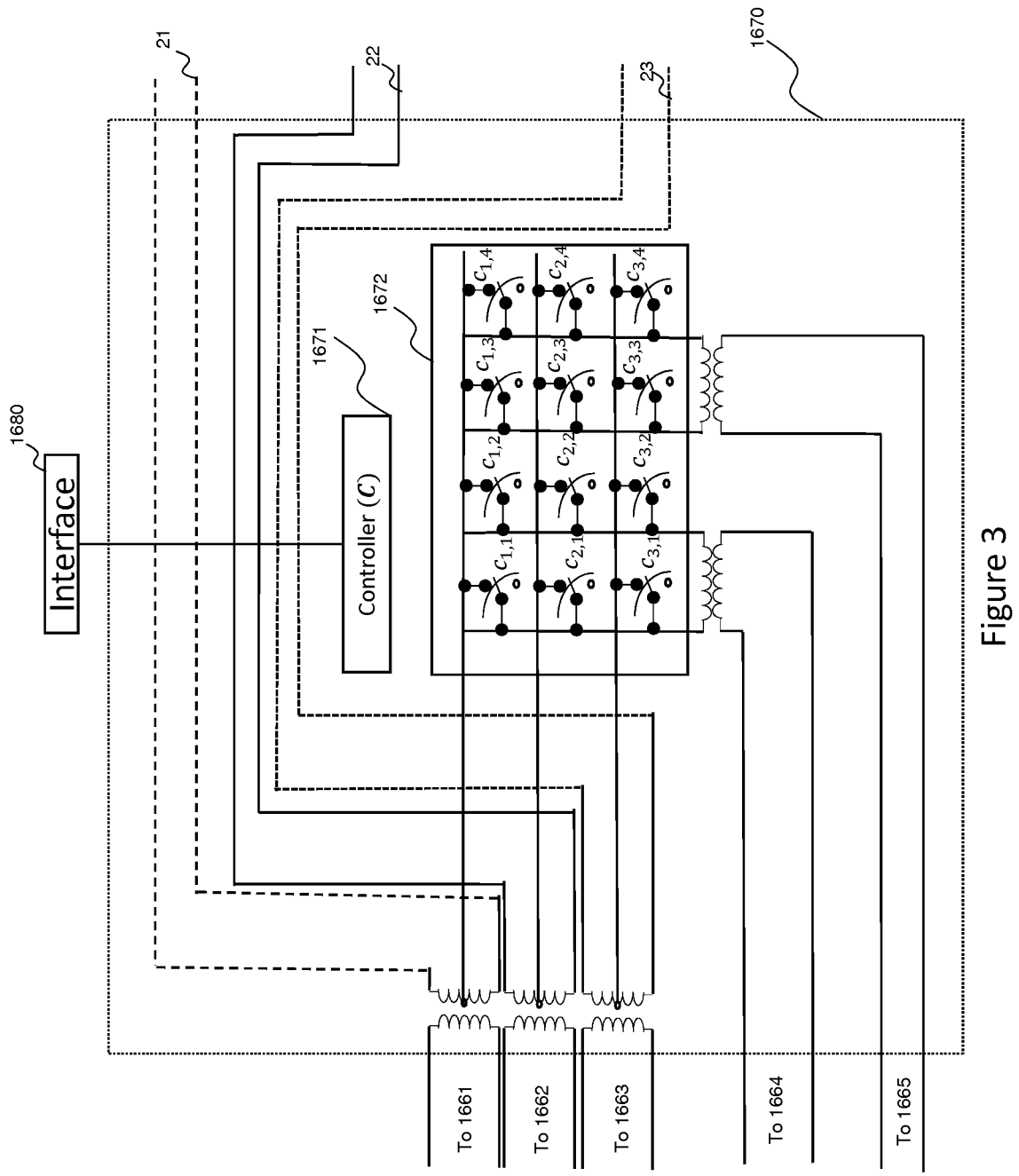
FIG. 3 is a schematic block diagram of the Multiple Phantom Access Device (MPAD) of FIG. 2, illustrating the device in greater detail.
Figure 4:
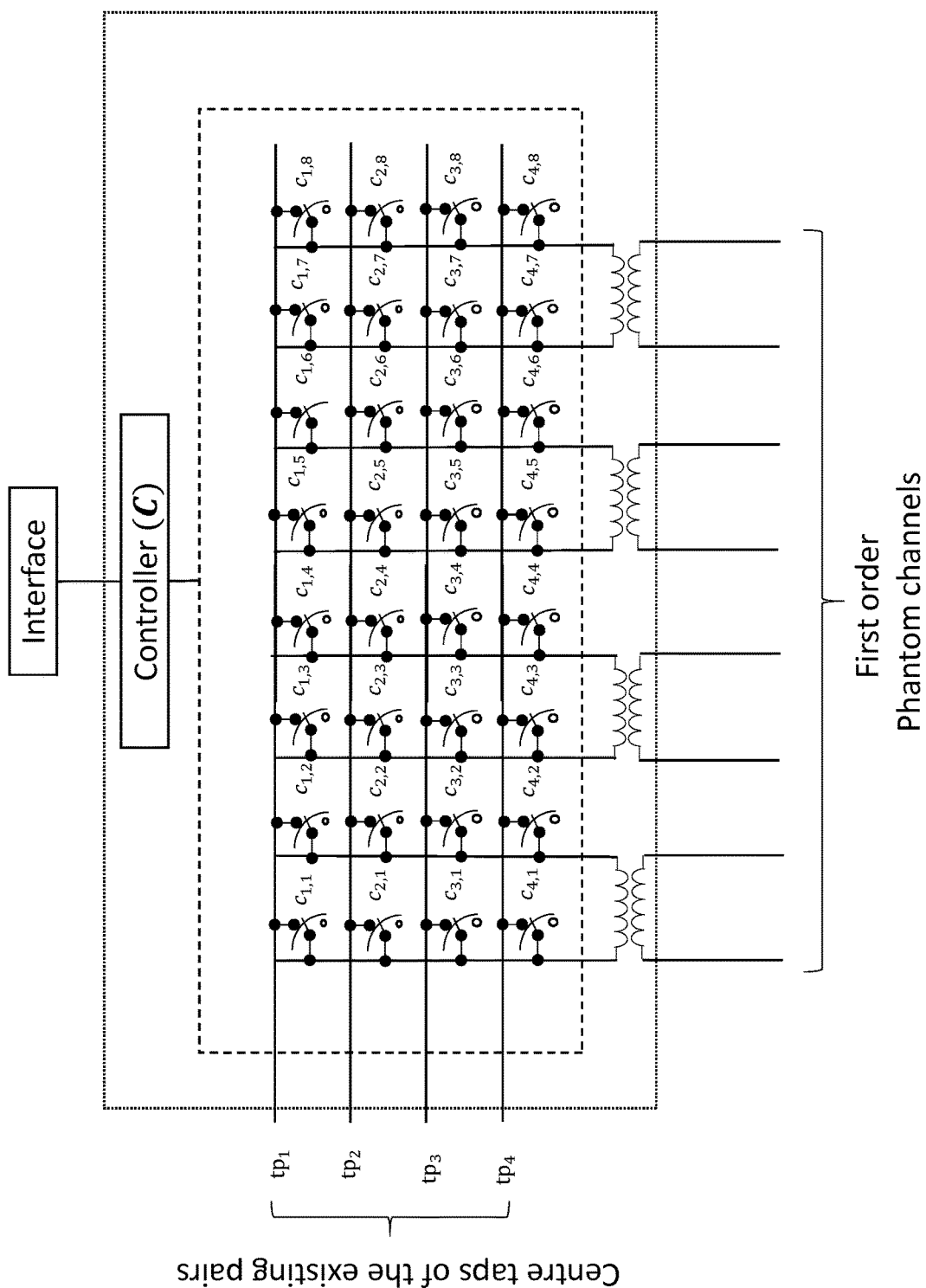
FIG. 4 is a schematic block diagram similar to FIG. 3, illustrating an alternative Multiple Phantom Access Device (MPAD) which is suitable for use with four rather than three wire pairs.

Referring now to FIG. 2, there is shown a schematic illustration of the principal components within the AN 16 and CPE modems 51, 52, 53 allowing the indirect phantom channels to be utilized according to a first simple embodiment chosen to illustrate the basic principles of the approach.

As shown, the AN 16 according to the embodiment illustrated in FIG. 2 comprises first, second and third Data Source, Data Encoder and Serial to Parallel converter (DS-DESP) modules 1611, 1612 and 1613. These are essentially conventional functions within a DSL modem and will not be further described here except to point out that each one's output is a set of data values d1-dM each of which can be mapped to both a set of one or more bits and to a point within a modulation signal constellation associated with a respective tone on which the data value is to be transmitted. For example if a tone t1 is determined to be able to carry 3 bits of data a corresponding data value will be set to one of 23=8 different values (e g to a decimal number between 0 and 7) each of which corresponds to a different constellation point within an associated signal constellation having 8 different constellation points. The data values for a single symbol can be thought of as forming a vector of data values (one for each data-carrying tone) and together carry the user data to be transmitted to the end user associated with a respective end user modem 51, 52, 53 together with any overhead data (e.g. Forward Error Correction data, etc.).

(N.B. It is worth noting that the assessment of the number of bits which any particular tone for any particular receiver may carry (per symbol) should be done with the benefit of the usage of any assisting phantom mode channels (as discussed below) and the benefit of vectoring taken into account. Thus it should be borne in mind that the present discussion relates to "Showtime" operation of the system once all training procedures have been completed. In overview the training involves firstly determining which phantom channel (or channels in embodiments in which more than one phantom channel can be exploited at the same time e g for embodiments in which more than 3 lines are connected to a common AN and are sufficiently closely cross-talk coupled to make exploitation of the phantoms worthwhile) to use and then setting parameters for its usage Having determined how to best exploit the phantom channels, then the training continues by performing vectoring training to determine the vectoring parameters to use and then determining the number of bits which can be used with both assistance from the phantom channel(s) and from vectoring.)

The data values leaving each DSDESP module 1611, 1612, 1613 are then passed (in an appropriate order) to respective Multiple bit level Quadrature Amplitude Modulation (M-QAM) modulators 1621, 1622, 1623 which convert each input data value to a respective complex number $x_1^1$ to $x_M^1$, $x_1^2$ to $x_M^2$ and $x_1^3$ to $x_M^3$ each of which represents a complex point within a complex number constellation diagram. For example a data value $d_1^1=7$ (=111 in binary) might be mapped by the M-QAM modulator 1621 to the complex number 1-i for tone 1 where tone 1 has been determined (by say modem 51) to be able to carry 3 bits of data each.

Each of these complex numbers $x_1^1$ to $x_M^1$, $x_1^2$ to $x_M^2$ and $x_1^3$ to $x_M^3$ is then entered into a vectoring precoder module 1630 (which in the present embodiment is a single common vectoring precoder module 1630) which performs a largely conventional vectoring operation in order to precode the transmissions to be sent using a combination of predetermined vectoring coefficients and information about the signals to be transmitted onto the other lines within the relevant vector group in a manner, which is well known to those skilled in the art, to compensate for the expected effects of cross-talk from the other lines in the vector group. The vectoring precoder module differs from a conventional vectoring precoder module in that it is operable to additionally precode the transmissions in such a way as to cause them to be pre-compensated for the expected crosstalk effects produced not only by the neighboring lines operating in a direct differential mode (as per standard vectoring), but also for the effects of crosstalk coming from any signals being transmitted onto one or more phantom channels (or other channels which are not direct differential mode channels). In order to do this (as will become apparent form the detailed description below) it is necessary for the vectoring precoder module 1630 to receive information about channel estimations of the respective phantom channel(s) (or other channels which are not direct differential mode channels) and also information about any weighting values used to combine signals to be transmitted over the phantom channel(s) (or other channels which are not direct differential mode channels). The output from the vectoring precoder module 1630 is thus a set of further modified complex numbers $\hat{\chi}_1^1$ to $\hat{\chi}_M^1$, $\hat{\chi}_1^2$ to $\hat{\chi}_M^2$ and $\hat{\chi}_1^3$ to $\hat{\chi}_M^3$.

The ability of the vectoring precoder module 1630 to receive the weighting values and channel estimation values which it needs to perform its precoding functions is illustrated in FIG. 2 by the line between the PC-MOP & MICOP & MRC & Management entity module 1690 (which performs general management functions in addition to its specific functions described in greater detail below and for brevity may hereinafter be referred to either as the "management entity" or the "PC-MOP module") and the vectoring precoder module 1630. In the present embodiment, the PC-MOP module calculates appropriate values for the channel estimations and the weighting values required by the vectoring precoder module and the MICOP & MRC precoder module 1640. In order to do this, it needs data reported back to it from the end user modems. The processes and procedures for achieving this are largely conventional and well known to persons skilled in the art and so they are not discussed in great detail herein except to note that it relies on a backward path from the receivers 51,52,53 to the transmitter 16. This is achieved in practice, of course, in that the receivers 51,52,53 are in practice transceivers capable of receiving and transmitting signals over the TMP's 51,52,53 as is the transmitter 16—the receiver parts of the transmitter 16 and the transmitter parts of the receivers 51,52,53 have simply been omitted from the drawings to avoid unnecessary complication of the figures because these parts are entirely conventional and not directly pertinent to the present disclosure. Moreover, each of the receivers additionally contains a management entity responsible for performing various processing and communication functions. Any of a number of suitable techniques can be employed for obtaining data useful in generating channel estimations. For example, known training signals can be transmitted onto selected channels by the transmitter 16 during a special training procedure and the results of detecting these by the receivers 51,52,53 can be sent back to the transmitter in a conventional manner. Additionally, special synchronization symbols can be transmitted, interspersed with symbols carrying user data, at predetermined "locations" within a "frame" comprising multiple symbols (e.g. at the beginning of each new frame) and the results of attempting to detect these synchronization symbols can also be sent back to the transmitter to generate channel estimation values. As is known to persons skilled in the art, different synchronization signals/symbols can be sent over different channels simultaneously and/or at different times etc. so that different channel estimations (including importantly indirect channels and indirect channels can be targeted and evaluated, etc.

As will be appreciated by those skilled in the art, the output of the vectoring precoder module 1630 is a set of modified (or predistorted) complex numbers $\check{\chi}_1^1$ to $\check{\chi}_M^1$, $\check{\chi}_1^2$ to $\check{\chi}_M^2$ and $\check{\chi}_1^3$ to $\check{\chi}_M^3$ as mentioned above. These complex numbers are then passed to a Mixed-Integer Convex Optimization Problem and Maximal Ratio Combiner (MICOP and MRC) pre-coder module 1640 (hereinafter referred to as the MICOP and MRC precoder module 1640) which, in the present embodiment, uses weighting values together with channel estimation values provided to it by the PC-MOP module 1690 to calculate, from the modified complex numbers received from the vectoring pre-coder module 1640 (and the weighting values and channel estimation values from the PC-MOP module 1690), further modified (or further pre-distorted) values for the complex numbers to be passed to the IFFTs 1651-1652. Note that in addition to further modifying the received numbers $\check{\chi}_1^1$ to $\check{\chi}_M^1$, $\check{\chi}_1^2$ to $\check{\chi}_M^2$ and $\check{\chi}_1^3$ to $\check{\chi}_M^3$ to generate corresponding further modified complex numbers $\ddot{x}_1^1$ to $\ddot{x}_M^1$, $\ddot{x}_1^2$ to $\ddot{x}_M^2$ and $\ddot{x}_1^3$ to $\ddot{x}_M^3$ which are to form (ultimately) the signals to be used in driving the respective TMPs 21, 22, 23 in direct differential mode, the MICOP and MRC precoder module 1640 additionally generates a new set of complex numbers $\ddot{x}_1^4$ to $\ddot{x}_M^4$ which are to form (ultimately) the signals to be used to drive a (single ended) phantom mode channel to be accessed via the MPAD module described below. The precise way in which this is done is described below with reference to appropriate equations. Once these values have been calculated by the MICOP and MRC precoder 1640 they are passed to the respective IFFT modules 1651-1654 (superscript 1 values going to IFFT 1651, superscript 2 values going to IFFT 1652, etc.) and the next two steps of the processing are conventional and not relevant to the present invention. Thus each set of generated values (e.g. to $\ddot{x}_1^1$ to $\ddot{x}_M^1$ is formed by the respective IFFT module into a quadrature time domain signal in the normal manner in Orthogonal Frequency Division Multiplexing (OFDM)/DMT systems). Then the time domain signals are processed by a suitable Analogue Front End (AFE) module 1661 to 1664 again in any suitable such manner including any normal conventional manner. After processing by the AFE module 1650, the resulting analogue signals are passed to the MPAD module 1670 (note MPAD stands for Multiple Phantom Access device).

The MPAD module is described in greater detail below, but in overview it provides switchable access to centre taps of any of the TMPs such that any of the possible phantom channels associated with the connected lines can be driven by the incoming signal arriving from AFE 1664 as well as directly passing on the signals from AFE's 1661-1663 directly to TMPs 21-23 for driving in the normal direct differential mode.

During transmission over the TMP connections 21, 22, 23 the signals will be modified in the normal way according to the channel response of the channel and due to external noise impinging onto the connections. In particular there will be cross-talking (and most particularly far-end cross-talking) between the three direct channels (the direct channels being one from the transmitter 16 to the modems 41-43 via the TMPs 21-23 and the phantom channel. However, the effect of the precoding is to largely precompensate for the effects of the cross talk. Additionally, the targeted receivers additionally benefit from increased SNR of the received signal destined for them arriving via cross talk from the phantom channel.

After passing over the TMP connections 21, 22, 23 the signals are received by the modems 41-43 at a respective Analogue Front End (AFE) module 5150, 5250, 5350 which performs the usual analogue front end processing. The thus processed signals are then each passed to a respective Fast Fourier Transform (FFT) module 5140, 5240, 5340 which performs the usual conversion of the received signal from the time domain to the frequency domain. The signals leaving the FFT modules 5140, 5240, 5340, $y_1^1$ to $y_M^1$, $y_1^2$ to $y_M^2$ and $y_1^3$ to $y_M^3$ are then each passed, in the present embodiment, to a respective Frequency domain EQualiser (FEQ) module 5130, 5230, 5330. The operation of such frequency domain equalizer modules is well-known in the art and will not therefore be further described herein. It should be noted however, that any type of equalization could be performed here, such as using a simple time-domain linear equalizer, a decision feedback equalizer, etc. For further information on equalization in OFDM systems, the reader is referred to: *"Zero-Forcing Frequency-Domain Equalization for Generalized DMT Transceivers with Insufficient Guard Interval,"* by Tanja Karp, Steffen Trautmann, Norbert J. Fliege, EURASIP Journal on Applied Signal Processing 2004:10, 1446-1459.

Once the received signal has passed through the AFE, FFT and FEQ modules, the resulting signals, $\ddot{x}_1^1$ to $\ddot{x}_M^1$, $\ddot{x}_1^2$ to $\ddot{x}_M^2$ and $\ddot{x}_1^3$ to $\ddot{x}_M^3$ should be similar to the complex numbers $x_1^1$ to $x_M^1$, $x_1^2$ to $x_M^2$ and $x_1^3$ to $x_M^3$ originally output by the M-QAM modulators 1621-1623 except that there will be some degree of error resulting from imperfect equalization of the channel and the effect of external noise impinging onto the lines during transmission of the signals between the AN and the modems 41-43. This error will in general differ from one receiving modem to the next. This can be expressed mathematically as $\ddot{x}_m^i = x_m^i + e_m^i$ etc. Provided the error however is sufficiently small the signal should be recoverable in the normal way after processing by the M-QAM demodulator modules 5120-5320 where a corresponding constellation point is selected for each value $\ddot{x}_m^i$ in dependence on its value (e.g. by selecting the constellation point closest to the point represented by the value $\ddot{x}_m^i$ unless trellis coding is being used, etc.). The resulting data values $\ddot{d}_1^1$ to $\ddot{d}_M^1$, $\ddot{d}_1^2$ to $\ddot{d}_M^2$ and $\ddot{d}_1^3$ to $\ddot{d}_M^3$ should mostly (apart from some small number of incorrectly detected values resulting from errors) correspond to the data values, $\ddot{d}_1^1$ to $\ddot{d}_M^1$, $\ddot{d}_1^2$ to $\ddot{d}_M^2$ and $\ddot{d}_1^3$ to $\ddot{d}_M^3$ originally entered to the corresponding M QAM modules 1621,1622, 1623 respectively within the AN/transmitter 16. These values are then entered into a respective decoder (and received data processing) module 5110, 5210 and 5230 which reassembles the detected data and performs any necessary forward error correction etc. and then presents the recovered user data to whichever service it is addressed to in the normal manner, thus completing the successful transmission of this data.

As mentioned above, following now from the above overview of FIG. 2, a more detailed explanation is provided of the non-conventional elements within the embodiment illustrated in FIG. 2 and described briefly above Thus, the MPAD 1670 is a component which provides access to different combinations of phantom channels MPAD 1670 tries all the possible combinations without repetition, e.g phantom of pair 1 and pair 2 is equivalent to the phantom of pair 2 and pair 1 and so will not be repeated). Herein, MPAD (1670) selects a specific phantom and it allows the transmitter 16 and each respective receiver 51, 52, 53 to tram up with each other and obtain the phantom channel as well as the direct differential mode pairs' channel coefficients at any given specific time slot At this stage the receivers 51, 52, 53 report either the overall combined channel or the phantoms only to the PC-MOP module 1690 depending on what signals are transmitted by the transmitter 16 which is done under the control of the PC-MOP module so that it knows what data is being reported back to it by the receivers. At the same time the Interface 1680 confirms the identification of the selected and currently operational phantom channel to PC-MOP module 1690 (which is also selected by the interface 1680 under instruction from the PC-MOP module) so that all channel gains and their identifications are capable of being ascertained by PC-MOP 1690 for subsequently passing to the vectoring precoder module 1630 and the MICOP & MRC precoder module 1640 for use in performing their preceding functions. The operation continues until all the phantom channels' combinations are tested Once the phantom tree is completed, PC-MOP 1690 decides the optimal phantom channels to be exploited to benefit specific pairs, all the pairs or to maximize the rate equilibrium of the users The decision is then forwarded to the MPAD module 1670 via the Interface 1680 to execute the decision and enable the access to the selected optimal phantom channels.

Once the optimum phantom channel is "constructed" and ready to be accessed, MICOP-MRC module 1640 then decides the optimal strategy to "steer" the constructed phantoms. This is done by selecting appropriate weighting values as described in greater detail below. The steering objective can be modified to maximize a specific pair or the rate equilibrium or any other desired objective.

It should be noted here that, in the present embodiment, the MICOP-MRC module 1640 selects two non-mutually orthogonal phantom channels for the MPAD to connect to and then ensures that the complex numbers $x_1^4$ to $x_M^4$ and $x_1^5$ to $x_M^5$ for passing the IFFT modules 1654 and 1655 are such that for any particular subscript value, j, at least one of $x_j^4$ and $x_j^5$ is set to zero. In other words, for any given tone or range of tones, it will not be the case that both signals are carrying data because at least one will have been set to a zero value—indicating that the signal (energy or strength)! at that tone or range of tones is to be zero. As noted above, in other more sophisticated (and complex) embodiments it may be advantageous to set one of the values to a non-zero value (instead of to a zero value) with a view to obtaining some benefit from the resulting cross talk In theory various alternative approaches can be considered (e.g. applying a signal to constructively interfere with another wanted signal once it has cross-talked across to the other wanted signal, applying a signal which will destructively interfere with an unwanted noise-causing signal on another line once the applied signal has cross-talked to that other line so as to reduce the noise on that line, etc) but in practice at present it is difficult to achieve significant gains from such approaches.

It should also be noted that if there are unused lines, or if a particular receiver becomes inactive such that its dedicated line becomes subsequently inactive, such auxiliary lines can be activated and optimized to interfere coherently with a specific target line to maximize its data late The optimization decides the signal array configuration (amplitude and phase) based on the full/partial knowledge of the active channel components Additional parameters can be incorporated into the optimization problem such as traffic demands, traffic types, quality of service tolerance, fairness sharing conditions, etc.

If a larger number of pairs (larger than the three pairs 21, 22, 23 in the above described illustrative embodiment) were involved it would be possible to have a greater number of mutually orthogonal phantom channels used to carry (non-redundant) data simultaneously. In any such embodiments, the MPAD may preferably be operable to permit a greater number than 2 phantom channels to be accessible at any single time, but the precoders may ensure that non-zero signals are transmitted only on to a subset of the phantom channels chosen such that all of the phantom channels in such a sub-set are mutually orthogonal to one another, thus if, for example, there were five twisted metallic pairs, the MPAD might arrange for 3 phantom channels to be connected at any point m time even though only up to two of these can be mutually orthogonal to one another at any point in time (e g the MPAD might connect p12, p34 and p35 to the transmitter arrangement, p34 and p35 are not mutually orthogonal to one another although both the pair p12 and p34 and the pair p12 and p35 are mutually orthogonal, thus the transmitter m such a case may arrange that non zero signals are transmitted only on to one of p34 and p35 at any given time in respect of any given tone). In general, in embodiments, the MPAD concurrently connects a number of phantom channels which is greater than the number of phantom channels which can form a mutually orthogonal group for the given number of twisted metallic pairs and then only a subset of these is actively transmitted over (e g using non-zero, non-redundant, data representing driving complex numbers) at any given point in time on any given tone (point in frequency).

There now follows a mathematical explanation of the functioning of the various elements In some cases the equations deal only with two direct differential mode signals and one phantom mode signal, however, it will be apparent to a person skilled in the art how to expand this to cover multiple different direct differential signals and multiple phantom signals based on the following example expositions Thus, considering a system with K twisted pairs, each pair denoted by $tp_i$ where $i, i \in K$ is the pair's index, there are $$M = \left\lfloor \frac{K}{d} \right\rfloor$$

first order orthogonal phantoms, where d is the required number of pans to construct a single phantom channel. Similar rule applies for second order phantoms and so on until the orthogonal phantom tree is fully obtained. The total number of the first order orthogonal candidates can be calculated by $$\binom{K}{d} = \frac{K!}{d!(K-d)!^2}$$

and we will consider this as the feasible domain for the PC-MOP problem, denoted by $\Phi$. The standard conventional channel is given as:

$$H = \begin{pmatrix} h_{1,1} & h_{1,2} & \cdots & h_{1,K} \\ h_{2,1} & h_{2,2} & \cdots & h_{2,K} \\ \vdots & \vdots & \ddots & \vdots \\ h_{K,1} & h_{K,2} & \cdots & h_{K,K} \end{pmatrix}$$

Where $h_{i,j}$ indicates the channel transfer function for the transmission by the transmitter onto the $j^{th}$ TMP (or phantom channel when extended as described immediately below) to the $i^{th}$ receiver as received at the $i^{th}$ receiver over the $i^{th}$ TMP or tp (=twisted pair).

A phantom channel ($\phi m, \forall m \in M$) is derived from a pair of tp, i e $\{tp_i, tp_j\}$ $i \neq j$

TABLE 1

First order phantom mode candidates

| $h_{k,\phi m}$ | $tp_i, tp_{j, i \neq j}$ | | | | | | | | |
|---|---|---|---|---|---|---|---|---|---|
| | {1, 2} | {1, 3} | {1, 4} | {1, 5} | {2, 3} | {2, 4} | {2, 5} | {3, 4} | {3, 5} | {4, 5} |
| $h_{5,\phi m}$ | 0.5 | 0.3 | 0.4 | 0.45 | 0.25 | 0.1 | 0.3 | 0.2 | 0.3 | 0.2 |
| $h_{4,\phi m}$ | 0.3 | 0.3 | 0.2 | 0.4 | 0.52 | 0.6 | 0.3 | 0.3 | 0.4 | 0.5 |

$\forall i \& j \in K$ when d is 2. Hence the extended channel becomes:

$$[H \mid H_\Phi] = H_T = \begin{pmatrix} h_{1,1} & h_{1,2} & \cdots & h_{1,K} & h_{1,\phi_1} & \cdots & h_{1,\phi_M} \\ h_{2,1} & h_{2,2} & \cdots & h_{2,K} & h_{2,\phi_1} & \cdots & h_{2,\phi_M} \\ \vdots & \vdots & \ddots & \vdots & \vdots & \ddots & \vdots \\ h_{K,1} & h_{K,2} & \cdots & h_{K,K} & h_{K,\phi_1} & \cdots & h_{K,\phi_M} \\ h_{\phi_1,1} & h_{\phi_1,2} & \cdots & h_{\phi_1,K} & h_{\phi_1,\phi_1} & \cdots & h_{\phi_1,\phi_M} \\ \vdots & \vdots & \ddots & \vdots & \vdots & \ddots & \vdots \\ h_{\phi_M,1} & h_{\phi_M,2} & \cdots & h_{\phi_M,K} & h_{\phi_M,\phi_1} & \cdots & h_{\phi_M,\phi_M} \end{pmatrix}$$

where $H_\psi$ is the phantom channel and H is the mixed mode channel. Herein, the PC-MOP can be formulated as follows:

$$\max H_\psi, \quad (1)$$

subject to:

$$\phi_m \in \psi \quad (2)$$

To illustrate the selection strategy of Pareto, we provide the following example: Assume a 5 pair cable in which pairs 5 and 4 are performing poorly in comparison to pairs 1, 2 and 3. Therefore, the phantoms may be derived and steered to maximize the performance of pairs 4 and 5. Maximum number of the first order orthogonal phantoms is $$\left\lfloor \frac{5}{2} \right\rfloor = 2$$

and the maximum number of combinations is $$\binom{5}{2} = \frac{5 \times 4 \times 3 \times 2 \times 1}{2 \times 1(3 \times 2 \times 1)} = 10.$$

Figure 5:
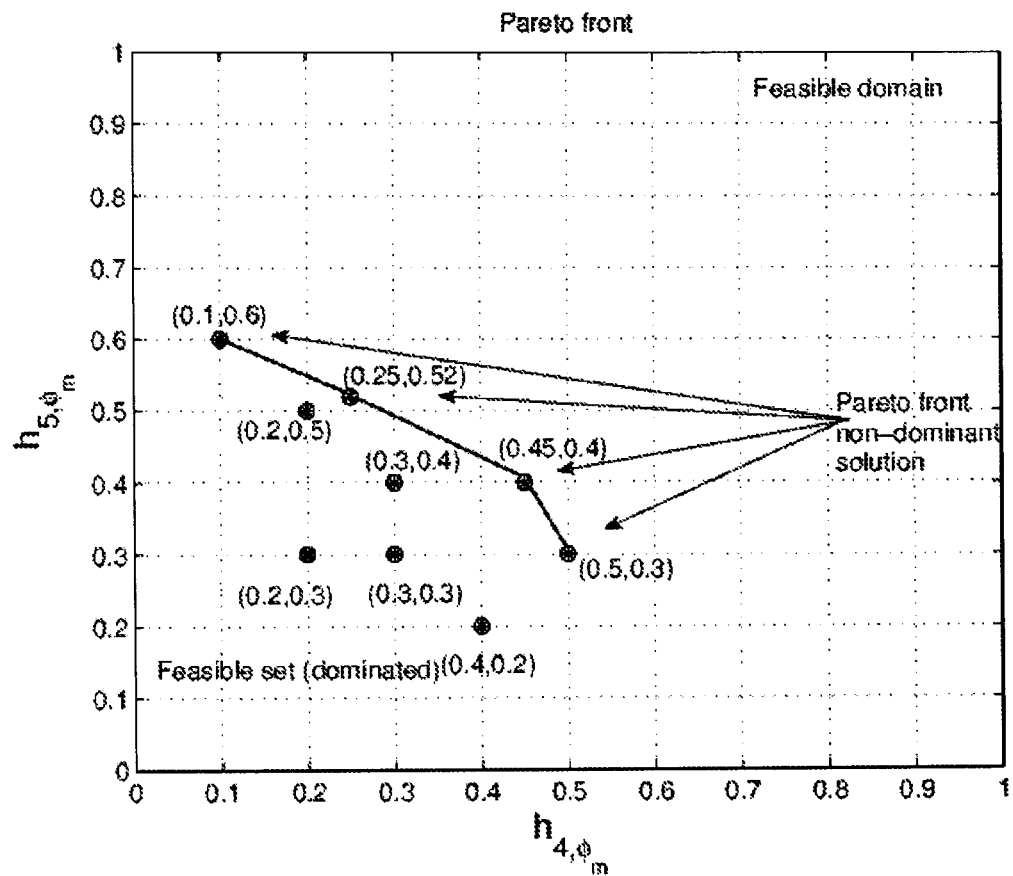
FIG. 5 is a graph illustrating an example pareto front for a simple case concerning selecting optimal phantom channels for use in assisting two different wire pairs/receivers.

Table 1 shows all the orthogonal phantom candidates and their mode-conversion crosstalk coefficient with the targeted pairs. To obtain Pareto front, we must determine the non-dominant solution, i.e. Pareto front. To examine the dominance of a set, it must contain at least one element greater than an element in another set if the objective function is set to maximization. In this particular example, {1, 2} dominates {1, 3}, {1, 4}, {2, 5} and {3, 4}. Similarly, candidates {1, 5}, {2, 3} and {2, 4} dominate {1, 3}, {1, 4}, {2, 5} and {3, 4}. Hence {1, 2}, {1, 5}, {2, 3} and {2, 4} are the non-dominant solution and known as the Pareto front; for example, see FIG. 5.

In a similar way, the objective function can include more pairs to benefit from the phantoms, also the phantom directivity can be altered to optimize the direct paths of the phantom mode if they are accessible at the receiving end, i.e. continuous phantoms. This remains the choice of the network engineer. Since predicting the phantom coupling strength from first principle is an arduous task, Pareto will be simply initialized in randomly in non-repetitive pattern. One also can model the phantoms and predict their performance in advance and select the optimal combination without the random training.

Once the phantoms are defined, it is vital to determine the optimal strategy to steer and split them to maximize the overall binder capacity whilst fairness constraints between the users are kept satisfied. To achieve this, we formulate the phantom/crosstalk (virtual) channel utilization problem as a mixed-integer convex optimization (VUT-MICOP) model in order to enable deriving the optimal solution.

In order to simply the problem, we assume a single phantom to be shared among K users to transmit N tones for a period of time T. Power level per tone is denoted by $p_{k,t,n}$ and the channel condition is $\gamma_{k,t,n}$ which is the ratio of power coupling coefficient to the noise level $$\left( \frac{|h_{k,\phi m}|^2}{n_{k,\phi m}} \right)_{t,n}.$$

The tone allocation factor is $\rho_{k,t,n}$ and finally the optimal capacity of the $m^{th}$ phantom is $C_{\phi m}$.

$$\max C_{\phi m} = \sum_{k,t,n} \rho_{k,t,n} \log_2(1 + p_{k,t,n} \gamma_{k,t,n}), \quad (3)$$

subject to:

$$\sum_{k,n} p_{k,t,n} \leq P_{\phi m}, \forall t \in T \quad (4a)$$

$$\sum_{t,n} \rho_{k,t,n} \log_2(1 + p_{k,t,n} \gamma_{k,n}) \leq R_k, \forall k \in K \quad (4b)$$

$$\sum_{k,t} \rho_{k,t,n} \leq T, \rho \in \{0, 1\}, \forall n \in N, \quad (4c)$$

Equation (3) is the objective function in which its limit is subject to the maximum transmitting power in 4a and the tone sharing criteria in 4c.

The optimization problem in its current form is non-linear with no known analytical solution 1. However, a simple modification has been applied to 3.

$$\max C_{\phi m} = \sum_{k,t,n} \rho_{k,t,n} \log_2\left(1 + \frac{s_{k,t,n} \gamma_{k,t,n}}{\rho_{k,t,n}}\right), \quad (5)$$

subject to:

$$\sum_{k,n} s_{k,t,n} \leq P_{\phi m}, \forall t \in T \quad (6a)$$

$$\sum_{t,n} \rho_{k,t,n} \log_2\left(1 + \frac{s_{k,t,n} \gamma_{k,t,n}}{\rho_{k,t,n}}\right) \leq R_k, \forall k \in K \quad (6b)$$

$$\sum_{k} \rho_{k,n} \leq 1, \forall n \in M, \forall t \in T \quad (6c)$$

The modified problem in 5 is concave and hence it is solvable as a convex problem. This problem as it stands provide the optimal TDMA and FDMA access to the phantoms. The analytical solution proceeds with the Lagrangian as follows:

$$\mathcal{L} = \sum_{k,t,n} \rho_{k,t,n} \log_2\left(1 + \frac{s_{k,t,n} \gamma_{k,t,n}}{\rho_{k,t,n}}\right) - \quad (7)$$

$$\sum_{t} \Omega_t \left( \sum_{k,n} s_{k,t,n} - P_{\phi m} \right) - \sum_{t,n} \mu_{t,n} \left( \sum_k \rho_{k,t,n} - 1 \right) -$$

$$\sum_k \left[ \sum_{t,n} \rho_{k,t,n} \log_2\left(1 + \frac{s_{k,t,n} \gamma_{k,t,n}}{\rho_{k,t,n}}\right) - R_j \right],$$

To solve 7 and prove its optimality, Karush Kuhn Tucker (KKT) conditions must be satisfied. The conditions are:

1. Feasibility of the primal constraints as well as the multipliers, i.e. ($\Omega$&$\mu$).

2. The gradient of 7 must become zero with respect to 6a and 4c.

Starting by differentiating 7 with respect to sk,n, i.e.

$$\frac{\partial \mathcal{L}}{\partial s_{k,n}} = 0, \quad (5)$$

then rearrange to obtain the optimal power formula:

$$p_{k,t,n} = \lambda_t(-\beta_k) - \frac{1}{\gamma_{k,t,n}}, \quad (8)$$

where $$\lambda_t = \frac{1}{\ln 2 \Omega_t}.$$

To guarantee feasible 8 and 4a, $$\frac{1}{\gamma_{k,t,n}} \le \lambda_t \le \frac{P_{\phi m} + \sum_{k,n} \frac{1}{\gamma_{k,t,n}}}{\sum_{k,n}(1-\beta_k)}.$$

The sharing factor simply guarantees that a single tone can only be assigned to a single user, e.g. tone 1 assigned to user 1 is represented by $\rho_{1,1}=1$ and elsewhere $\rho_{k\ne1,1}=0$. Hence constraint 4c is relaxed to:

$$\rho_{k,n} = \begin{cases} 1 & \text{if the } n^{th} \text{ tone is assigned to the } k^{th} \text{ user}, \\ 0 & \text{elsewhere}. \end{cases}$$

In a similar fashion to 8, we differentiate 7 with respect $\rho_{k,n}$, rearrange and substitute 8 to obtain the following:

$$\mu_{t,n} = \log_2[\lambda_t(1-\beta_k)\gamma_{k,t,n}] - \frac{1}{\ln 2}\left[1 - \frac{1}{\lambda_t(1-\beta_k)\gamma_{k,t,n}}\right], \quad (9)$$

$$\forall_n \in N$$

The user which maximizes 9 for tone n represents the optimal user. Hence k is obtained by:

$$\hat{k} = \arg \max \mu_{t,n}, \forall t \in T, \forall n \in N \quad (10)$$

Similar to section 1, the method can be applied to the differential lines except that the k domain limited to each line itself. Hence, the binder capacity becomes:

$$C_{binder} = \sum_{ph} C_{\phi m} + \sum_{dif} C_{dif}, \quad (11)$$

Once the phantom sharing and power allocation polices are obtained. The power allocation per line needs to be re-configured to insure that the phantom gain will result to capacity gain. The optimization problem is similar to 5 excluding 4c. Line's channel gain in the presence of phantom gain becomes:

$$\gamma_{\hat{k},t,n} = \left(\frac{|h_{\hat{k},\hat{k}}|^2}{n_{\hat{k},\hat{k}}} + \frac{\sum_m p_{\hat{k},t,n}|h_{\hat{k},\phi_m}|^2 p_{\phi_m,t,n}}{n_{\hat{k},\phi_m}}\right) \quad (12)$$

$$\max C_{\hat{k},t} = \sum_n \log_2(1 + p_{\hat{k},t,n}\gamma_{\hat{k},t,n}), \forall t \in T \quad (13)$$

subject to:

$$\sum_n p_{\hat{k},t,n} \le P_k, \forall \hat{k} \in K, \forall t \in T, \quad (14a)$$

$$\mathcal{L} = \sum_n \log_2(1 + p_{\hat{k},t,n}\gamma_{\hat{k},t,n}) - \Omega_t\left(\sum_n p_{\hat{k},t,n} - P_k\right) \quad (15)$$

$$p_{\hat{k},t,n} = \lambda_t - \frac{1}{\gamma_{\hat{k},t,n}}, \quad (16)$$

if n $\hat{k}$, $\hat{k}=n$ $\hat{k}_{\phi m}$, becomes:

$$p_{\hat{k},t,n} = \lambda_t - \frac{n_{\hat{k},\hat{k}}}{|h_{\hat{k},\hat{k}}|^2 + \sum_m p_{\hat{k},t,n}|h_{\hat{k},\phi_m}|^2 p_{\phi_m,t,n}} \quad (17)$$

Note: Tone/subcarrier spacing is excluded from the optimization problems because it is a constant and hence the units of the current capacity are bandwidth-normalized (known as bandwidth or spectrum efficiency) in $$\frac{\text{bps}}{\text{Hz}}.$$

Alternative formulation to the embodiment in [ ], we provide a model to allow phantom/crosstalk channels exploitation over the same spectrum simultaneously for all existing line users subject to a power constrain for the entire spectrum. We apply problem decomposition first to determine the power allocation per tone/carrier then optimize the distribution of tone power between the active users. To enable this, the problem becomes:

$$\max \sum_n \log_2\left(1 + p_n \sum_k \gamma_{k,n}\right) \quad (18)$$

subject to:

$$\sum_n p_n \le P_T \quad (19a)$$

Applying the Lagrangian:

$$\mathcal{L} = \sum_n \log_2\left(1 + p_n \sum_k \gamma_{k,n}\right) - \lambda\left(\sum_n p_n - P_T\right) \quad (20)$$

Take $$\frac{\partial \mathcal{L}}{\partial p_n}$$

and then rearrange to obtain:

$$p_n = \lambda^{-1} - \frac{1}{\sum_k \gamma_{k,n}}, \quad (21)$$

we plug the latter in equation (19a) to calculate the multiplier and then again in (21).

Now we optimize the distribution of $p_n$ between K users.

$$\max \sum_k \log_2(1 + p_{k,n}\gamma_{k,n}) \quad (22)$$

subject to:

$$\sum_k p_{k,n} \leq p_n, \quad (23a)$$

Applying the Lagrangian:

$$\mathcal{L} = \sum_k \log_2(1 + p_{k,n}\gamma_{k,n}) - \lambda_n \left( \sum_k p_{k,n} - p_n \right) \quad (24)$$

Similar to previous steps, we obtain the optimal power equation:

$$p_{k,n} = \lambda_n^{-1} - \frac{1}{\gamma_{k,n}}, \quad (25)$$

Example-01: Assume two users to share a $p_n$. The optimization problem can be simplified to:

$$\max \; [(1+p_{1,n}\gamma_{1,n})(1+p_{2,n}\gamma_{2,n})] \quad (26)$$

subject to:

$$p_{1,n}+p_{2,n}=p_n, \quad (27)$$

The problem in (26) is easily solvable, two equations and two unknowns. One can prove the optimal power allocation from both problem (22) and (26) is:

$$p_{1,n} = \frac{p_n \left( \prod_{k=1}^{2} \gamma_{k,n} \right) + \gamma_{1,n} - \gamma_{2,n}}{2 \prod_{k=1}^{2} \gamma_{k,n}} \quad (28)$$

Finally $p_{2,n}$ is equal to $p_n - p_{1,n}$.

Example-02: In terms of signal precoding and real signal injection for a given MPAD (1670) settings, we consider the following:

The data, $[d_1 d_2]$, are first modulated, e.g. using M-QAM, at a given subcarrier (n) to produce the original data symbols:

$$X = \begin{pmatrix} x_1 \\ x_2 \end{pmatrix}$$

The precoded data symbols (using MICOP-MRC) are calculated as follows:

$$\hat{X} = \begin{pmatrix} \frac{h_{1,1}^*}{|h_{1,1}|} & 0 \\ 0 & \frac{h_{2,2}^*}{|h_{2,2}|} \\ \frac{\rho_1 h_{1,3}^*}{|h_{1,3}|} & \frac{\rho_2 h_{2,3}^*}{|h_{2,3}|} \end{pmatrix} \begin{pmatrix} x_1 \\ x_2 \end{pmatrix} = \begin{pmatrix} \frac{x_1 h_{1,1}^*}{|h_{1,1}|} \\ \frac{x_2 h_{2,2}^*}{|h_{2,2}|} \\ \frac{x_1 \rho_1 h_{1,3}^*}{|h_{1,3}|} + \frac{x_2 \rho_2 h_{2,3}^*}{|h_{2,3}|} \end{pmatrix}$$

where $\rho_1+\rho_2=1$. Note that $$p_n = \left| \frac{x_1 \rho_1 h_{1,3}^*}{|h_{1,3}|} \right|^2 + \left| \frac{x_2 \rho_2 h_{2,3}^*}{|h_{2,3}|} \right|^2$$

where $\left| \frac{x_1 \rho_1 h_{1,3}^*}{|h_{1,3}|} \right|^2 = p_{1,n}$ and $\left| \frac{x_2 \rho_2 h_{2,3}^*}{|h_{2,3}|} \right|^2 = p_{2,n}$.

Hence, $$\rho_1 = \frac{|h_{1,3}| \sqrt[2]{P_{1,n}}}{|x_1 h_{1,3}^*|} \text{ and } \frac{|h_{2,3}| \sqrt[2]{P_{2,n}}}{|x_2 h_{2,3}^*|},$$

see Example-01. Index n is dropped from the matrices for clarity.

Non-vectored received signals:

$$\tilde{Y} = \begin{pmatrix} h_{1,1} & h_{1,2} & h_{1,3} \\ h_{2,1} & h_{2,2} & h_{2,3} \end{pmatrix} \begin{pmatrix} \frac{x_1 h_{1,1}^*}{|h_{1,1}|} \\ \frac{x_2 h_{2,2}^*}{|h_{2,2}|} \\ \frac{x_1 \rho_1 h_{1,3}^*}{|h_{1,3}|} + \frac{x_2 \rho_2 h_{1,3}^*}{|h_{2,3}|} \end{pmatrix}$$

To remove the unwanted coupling after combining, the new channel coefficients must be calculated at the presence of the MRC coefficients since that the 1630 is seeing the MICOP-MRC part of the channel:

$$\begin{pmatrix} h_{1,1} & h_{1,2} & h_{1,3} \\ h_{2,1} & h_{2,2} & h_{2,3} \end{pmatrix} \begin{pmatrix} \frac{h_{1,3}^*}{|h_{1,3}|} & 0 \\ 0 & \frac{h_{2,2}^*}{|h_{2,2}|} \\ \frac{\rho_3 h_{1,3}^*}{|h_{1,3}|} & \frac{\rho_2 h_{2,3}^*}{|h_{2,3}|} \end{pmatrix} =$$

$$\begin{pmatrix} |h_{1,1}| + \rho_1|h_{1,3}| & \frac{h_{1,2}h_{2,2}^*}{|h_{2,2}|} + \frac{\rho_2 h_{1,3} h_{2,3}^*}{|h_{2,3}|} \\ \frac{h_{2,1}h_{1,1}^*}{|h_{1,1}|} + \frac{\rho_3 h_{2,3}h_{1,3}^*}{|h_{1,3}|} & |h_{2,2}| + \rho_2|h_{2,3}| \end{pmatrix}$$

The vectoring precoder in 1630 becomes:

$$\begin{pmatrix} |h_{1,1}| + \rho_1|h_{1,3}| & \frac{h_{2,2}h_{2,2}^*}{|h_{2,2}|} + \frac{\rho_2 h_{1,3} h_{2,3}^*}{|h_{2,3}|} \\ \frac{h_{2,1}h_{1,3}^*}{|h_{1,1}|} + \frac{\rho_1 h_{2,3}h_{1,3}^*}{|h_{1,3}|} & |h_{2,2}| + \rho_2|h_{2,3}| \end{pmatrix}^{-1} \begin{pmatrix} |h_{1,1}| + \rho_1|h_{1,3}| & 0 \\ 0 & |h_{2,2}| + \rho_2|h_{2,3}| \end{pmatrix}$$

Hence the full system becomes:

$$\begin{pmatrix} y_1 \\ y_2 \end{pmatrix} = \begin{pmatrix} h_{1,1} & h_{1,2} & h_{1,3} \\ h_{2,1} & h_{2,2} & h_{2,3} \end{pmatrix} \begin{pmatrix} \frac{h_{1,1}^*}{|h_{1,1}|} & 0 \\ 0 & \frac{h_{2,2}^*}{|h_{2,2}|} \\ \frac{\rho_1 h_{1,3}^*}{|h_{1,3}|} & \frac{\rho_2 h_{2,3}^*}{|h_{2,3}|} \end{pmatrix} =$$

$$\begin{pmatrix} |h_{1,1}| + \rho_1|h_{1,3}| & \frac{h_{1,2}h_{2,2}^*}{|h_{2,2}|} + \frac{\rho_2 h_{1,3} h_{2,3}^*}{|h_{2,3}|} \\ \frac{h_{2,3}h_{1,1}^*}{|h_{1,1}|} + \frac{\rho_1 h_{2,3}h_{1,3}^*}{|h_{1,3}|} & |h_{2,2}| + \rho_2|h_{2,3}| \end{pmatrix}^{-1}$$

$$\begin{pmatrix} |h_{1,1}| + \rho_1|h_{1,3}| & 0 \\ 0 & |h_{2,2}| + \rho_2|h_{2,3}| \end{pmatrix} \begin{pmatrix} x_1 \\ x_2 \end{pmatrix}.$$

And finally, the transmitted X is estimated at FEQs by:

$$\ddot{X} = \begin{pmatrix} \ddot{x}_1 \\ \ddot{x}_2 \end{pmatrix} = \begin{pmatrix} |h_{1,1}| + \rho_1|h_{1,3}| & 0 \\ 0 & |h_{2,2}| + \rho_2|h_{2,3}| \end{pmatrix}^{-1} \begin{pmatrix} y_1 \\ y_2 \end{pmatrix}$$

Signal Tracking in 16

1.
After data source (1611):

$$D = \begin{pmatrix} d_1 \\ d_2 \end{pmatrix}$$

2.
After M-QAM (1621):

$$X = \begin{pmatrix} x_1 \\ x_2 \end{pmatrix}$$

3.
After the vectoring unit (1630):

$$\check{X} = \begin{pmatrix} \check{x}_1 \\ \check{x}_2 \end{pmatrix} = \begin{pmatrix} |h_{1,1}| + \rho_1|h_{1,3}| & \frac{h_{1,2}h_{2,2}^*}{|h_{2,2}|} + \frac{\rho_2 h_{1,3} h_{2,3}^*}{|h_{2,3}|} \\ \frac{h_{2,1}h_{1,1}^*}{|h_{3,3}|} + \frac{\rho_1 h_{2,3}h_{1,3}^*}{|h_{1,3}|} & |h_{2,2}| + \rho_2|h_{2,3}| \end{pmatrix}^{-1}$$

$$\begin{pmatrix} |h_{1,1}| + \rho_1|h_{1,3}| & 0 \\ 0 & |h_{2,2}| + \rho_2|h_{2,3}| \end{pmatrix} \begin{pmatrix} x_1 \\ x_2 \end{pmatrix}$$

Expanded to:

$$\check{X} = \begin{pmatrix} \check{x}_1 \\ \check{x}_2 \end{pmatrix} = \frac{1}{\left[ (|h_{1,1}| + \rho_1|h_{1,3}|) * (|h_{2,2}| + \rho_2|h_{2,3}|) - \left( \frac{h_{1,2}h_{2,2}^*}{|h_{2,2}|} + \frac{\rho_2 h_{1,3} h_{2,3}^*}{|h_{2,3}|} \right) * \left( \frac{h_{2,1}h_{1,1}^*}{|h_{1,1}|} + \frac{\rho_1 h_{2,3}h_{1,3}^*}{|h_{1,3}|} \right) \right]}$$

$$\begin{pmatrix} |h_{2,2}| + \rho_2|h_{2,3}| & -\frac{h_{2,1}h_{1,1}^*}{|h_{1,1}|} - \frac{\rho_1 h_{2,3}h_{1,3}^*}{|h_{1,3}|} \\ -\frac{h_{1,2}h_{2,2}^*}{|h_{2,2}|} + \frac{\rho_2 h_{1,3} h_{2,3}^*}{|h_{2,3}|} & |h_{1,1}| + \rho_1|h_{1,3}| \end{pmatrix}$$

$$\begin{pmatrix} |h_{1,1}| + \rho_1|h_{1,3}| & 0 \\ 0 & |h_{2,2}| + \rho_2|h_{2,3}| \end{pmatrix} \begin{pmatrix} x_1 \\ x_2 \end{pmatrix}$$

and hence, $$\check{X} = \begin{pmatrix} \check{x}_1 \\ \check{x}_2 \end{pmatrix} = \frac{1}{\left[ (|h_{1,1}| + \rho_1|h_{1,3}|) * (|h_{2,2}| + \rho_2|h_{2,3}|) - \left( \frac{h_{1,2}h_{2,2}^*}{|h_{2,2}|} + \frac{\rho_2 h_{1,3} h_{2,3}^*}{|h_{2,3}|} \right) * \left( \frac{h_{2,1}h_{1,1}^*}{|h_{1,1}|} + \frac{\rho_1 h_{2,3}h_{1,3}^*}{|h_{1,3}|} \right) \right]}$$

$$\begin{pmatrix} (|h_{1,1}| + \rho_1|h_{1,3}|) * & (|h_{1,1}| + \rho_1|h_{1,3}|) * \\ (|h_{2,2}| + \rho_2|h_{2,3}|) & \left( \frac{h_{2,1}h_{1,1}^*}{|h_{1,1}|} - \frac{\rho_1 h_{2,3}h_{1,3}^*}{|h_{1,3}|} \right) \\ (|h_{2,2}| + \rho_2|h_{2,3}|) * & (|h_{2,2}| + \rho_2|h_{2,3}|) * \\ \left( -\frac{h_{1,2}h_{2,2}^*}{|h_{2,2}|} - \frac{\rho_2 h_{1,3} h_{2,3}^*}{|h_{2,3}|} \right) & (|h_{1,1}| + \rho_1|h_{1,3}|) \end{pmatrix} \begin{pmatrix} x_1 \\ x_2 \end{pmatrix}$$

Finally:

$$\begin{pmatrix}\check{x}_1\\\check{x}_2\end{pmatrix} = \begin{pmatrix}\dfrac{x_1(|h_{1,1}|+\rho_1|h_{1,3}|)*(|h_{2,2}|+\rho_2|h_{2,3}|)+}{x_2(|h_{1,1}|+\rho_1|h_{1,3}|)*\left(-\dfrac{h_{2,1}h_{1,1}^*}{|h_{1,1}|}+\dfrac{\rho_1 h_{2,3}h_{1,3}^*}{|h_{1,3}|}\right)}\\\left[(|h_{1,1}|+\rho_1|h_{1,3}|)*(|h_{2,2}|+\rho_2|h_{2,3}|)-\left(\dfrac{h_{1,2}h_{2,2}^*}{|h_{2,2}|}+\dfrac{\rho_2 h_{1,3}h_{2,3}^*}{|h_{2,3}|}\right)*\left(\dfrac{h_{2,1}h_{1,1}^*}{|h_{1,1}|}+\dfrac{\rho_1 h_{2,3}h_{1,3}^*}{|h_{1,3}|}\right)\right]\\\dfrac{x_1(|h_{2,2}|+\rho_2|h_{2,3}|)*\left(-\dfrac{h_{1,2}h_{2,2}^*}{|h_{2,2}|}-\dfrac{\rho_2 h_{1,3}h_{2,3}^*}{|h_{2,3}|}\right)+}{x_2(|h_{2,2}|+\rho_2|h_{2,3}|)*(|h_{1,1}|+\rho_1|h_{1,3}|)}\\\left[(|h_{1,1}|+\rho_1|h_{1,3}|)*(|h_{2,2}|+\rho_2|h_{2,3}|)-\left(\dfrac{h_{1,2}h_{2,2}^*}{|h_{2,2}|}+\dfrac{\rho_2 h_{1,3}h_{2,3}^*}{|h_{2,3}|}\right)*\left(\dfrac{h_{2,1}h_{1,1}^*}{|h_{1,1}|}+\dfrac{\rho_1 h_{2,3}h_{1,3}^*}{|h_{1,3}|}\right)\right]\end{pmatrix}$$

4.

After MICOP-MRC (1640)

$$\hat{X} = \begin{pmatrix}\dfrac{h_{1,1}^*}{|h_{1,1}|} & 0\\0 & \dfrac{h_{2,2}^*}{|h_{2,2}|}\\\dfrac{\rho_1 h_{1,3}^*}{|h_{1,3}|} & \dfrac{\rho_2 h_{2,3}^*}{|h_{2,3}|}\end{pmatrix}\begin{pmatrix}\check{x}_1\\\check{x}_2\end{pmatrix} = \begin{pmatrix}\dfrac{\check{x}_1 h_{1,1}^*}{|h_{1,1}|}\\\dfrac{\check{x}_2 h_{2,2}^*}{|h_{2,2}|}\\\dfrac{\check{x}_1\rho_1 h_{1,3}^*}{|h_{1,3}|}+\dfrac{\check{x}_2\rho_2 h_{2,3}^*}{|h_{2,3}|}\end{pmatrix}$$

or equivalently:

$$\hat{X} = \begin{pmatrix}\dfrac{h_{1,1}^*}{|h_{1,1}|} & 0\\0 & \dfrac{h_{2,2}^*}{|h_{2,2}|}\\\dfrac{\rho_1 h_{1,3}^*}{|h_{1,3}|} & \dfrac{\rho_2 h_{2,3}^*}{|h_{2,3}|}\end{pmatrix}\begin{pmatrix}\dfrac{x_1(|h_{1,1}|+\rho_1|h_{1,3}|)*(|h_{2,2}|+\rho_2|h_{2,3}|)+}{x_2(|h_{1,1}|+\rho_1|h_{1,3}|)*\left(-\dfrac{h_{2,1}h_{1,1}^*}{|h_{1,1}|}+\dfrac{\rho_1 h_{2,3}h_{1,3}^*}{|h_{1,3}|}\right)}\\\left[(|h_{1,1}|+\rho_1|h_{1,3}|)*(|h_{2,2}|+\rho_2|h_{2,3}|)-\left(\dfrac{h_{1,2}h_{2,2}^*}{|h_{2,2}|}+\dfrac{\rho_2 h_{1,3}h_{2,3}^*}{|h_{2,3}|}\right)*\left(\dfrac{h_{2,1}h_{1,1}^*}{|h_{1,1}|}+\dfrac{\rho_1 h_{2,3}h_{1,3}^*}{|h_{1,3}|}\right)\right]\\\dfrac{x_1(|h_{2,2}|+\rho_2|h_{2,3}|)*\left(-\dfrac{h_{1,2}h_{2,2}^*}{|h_{2,2}|}-\dfrac{\rho_2 h_{1,3}h_{2,3}^*}{|h_{2,3}|}\right)+}{x_2(|h_{2,2}|+\rho_2|h_{2,3}|)*(|h_{1,1}|+\rho_1|h_{1,3}|)}\\\left[(|h_{1,1}|+\rho_1|h_{1,3}|)*(|h_{2,2}|+\rho_2|h_{2,3}|)-\left(\dfrac{h_{1,2}h_{2,2}^*}{|h_{2,2}|}+\dfrac{\rho_2 h_{1,3}h_{2,3}^*}{|h_{2,3}|}\right)*\left(\dfrac{h_{2,1}h_{1,1}^*}{|h_{1,1}|}+\dfrac{\rho_1 h_{2,3}h_{1,3}^*}{|h_{1,3}|}\right)\right]\end{pmatrix}$$

5.

Finally the transmitted signal Y is modelled as:

$$Y = \begin{pmatrix}y_1\\y_2\end{pmatrix} = \begin{pmatrix}|h_{1,1}|+\rho_1|h_{1,3}| & \dfrac{h_{1,2}h_{2,2}^*}{|h_{2,2}|}+\dfrac{\rho_2 h_{1,3}h_{2,3}^*}{|h_{2,3}|}\\\dfrac{h_{2,1}h_{1,1}^*}{|h_{1,1}|}+\dfrac{\rho_1 h_{2,3}h_{1,3}^*}{|h_{1,3}|} & |h_{2,2}|+\rho_2|h_{2,3}|\end{pmatrix}\begin{pmatrix}\check{x}_1\\\check{x}_2\end{pmatrix}+\begin{pmatrix}n_1\\n_2\end{pmatrix}$$

where n is the background noise.

6.

At the receiver end, the configuration of the FEQ for a given line, e.g. k, is $(|h_{k,k}|+p_k|h_{k,3}|)_{-1}$.

Generalization of Above Equations to Cover Cases of Multiple Common Indirect Channels It will be apparent to a person skilled in the art that the above equations may be modified in a straightforward manner to cover more complex situations including an arbitrarily large number of user data streams d1, d2, dk, with a (generally) corresponding number of direct differential mode channels over which to transmit corresponding streams of QAM constellation points x 1, x2, xk, an arbitrarily large number of common indirect channels 'Ұ1, 'Ұ2, 'Ұ10c, where there are IDC indirect channels m total (e g made of M phantom channels cp1, CJ12, CJ1M and IDC-M crosstalk channels). In such a case, crosstalk channels can be handled in exactly the same way as phantom channels in terms of generating and using an extended channel model Hr as discussed above with particular reference to phantom channels Moreover, in such a case, a weighting value can be specified for each combination of an indirect channel and a user data stream, in respect of each tone, n, giving rise to K×IDC×N weighting values in total (although a large number of these may beset to 0).

Summary of the Methodology

From the above discussion, it will be apparent to a person skilled in the art that a suitable method of operation for selecting phantom channels to use may proceed along the following lines in which three sub-methods (1 1, 1.2 and 1 3) are employed consecutively Sub-method 1 is to score all possibly usable phantom channels (which forms a first set of channels)—this can be done in numerous ways, just one possibility of which is described below in steps 1 1 to 114, sub-method 2 is then to select a first subset of usable phantoms (forming a second set of channels) based on the scores obtained m sub-method 1 (just one possibility for doing this being described in 1 2 below) and sub-method 3 is then to select tertiary sets each of which is a proper subset of the second set, one tertiary set being selected for each tone (and a method for doing this is described below m 1.3 to 1 3 3.
  1 1 For each tone
    1.1 1 For each selectable phantom channel (the selectable phantom channels forming a first set of phantom channels)
      1.1 1 1 Identify receiver with maximum cross-talk coupling magnitude from phantom channel,
      1 1.1.2 IF cross-talk coupling magnitude exceeds a threshold THEN keep phantom channel as an option for that tone, otherwise discard from further consideration for that tone,
      1 1 1 3 Consider next selectable phantom channel until all considered,
    112 For remaining phantom channels (after each selectable phantom has been considered in steps 1111 and 1112) assign a per tone part score based on the magnitude of maximum cross-talk coupling to each remaining phantom channel e.g. give a score of 3 to highest, 2 to second highest, 1 to third highest and 0 to any others, or use the cross talk coupling magnitude as a per tone part score and record in an array, indexed by tone number, the phantom channel, its per tone part score and the receiver for which that per tone part score is applicable,
    113 Add each per tone part score to a current total score for that phantom (which is initialized to zero for each phantom channel at step 1.1 or somewhere prior to starting 1 1 1 1) to keep a running total score for each selectable phantom channel
1 1 4 Consider next tone until all tones have been considered
1 2 Once all tones have been considered a total score will have been obtained for each selectable phantom channel over all tones At this point a sub-method 2 can then be employed to choose the top scoring phantom channels up to the max number that the MPAD can simultaneously connect (to the transmitter) to form a second set of phantom channels being a proper subset of the first set of channels (including some which are not mutually orthogonal in almost all practical cases since the MPAD can simultaneously connect more phantom channels than can be selected so as to be mutually orthogonal to one another) and control the MPAD to connect its output terminals to these phantom channels,
1 3 Then a sub-method 3 can be performed which may involve a second iteration through each tone such that for each tone,
1 3 1 identify for each tone a tertiary set of mutually orthogonal phantom channels as a proper subset of the second set, such that the summation of the per tone part scores of the phantom channels within the tertiary set is maximized
1 3 2 for each phantom channel in the tertiary set, look up the associated receiver for that channel in that tone and assign a weighting of 1 (for that tone) for the signal derived from the signal to be sent to that receiver to go over that phantom channel;
1 3 3 Once this has been done for each tone (thus generating (probably) a different tertiary set for each tone) end the method.

The effect of the above illustrative method is to obtain a second set of phantom channels which are "good" in the sense that they have high crosstalk coupling and thus are good for injecting energy into differential mode neighboring lines, and then to obtain tertiary sets which are formed of phantom channels taken from the second set (they are taken from the second set because only phantoms in the second set can be directly driven via the MPAD once it has connected to the phantoms in the second set) selected so as to be the "best" phantoms from the second set for each tone to which the tertiary set corresponds. Moreover it generates weightings which give the full benefit of each utilized phantom channel to the (single) direct differential mode channel which is likely to benefit most from using that channel (because it has the highest cross-talk coupling to that phantom channel) Of course if a different objective were desired, e g to benefit only specified receivers, then a different approach would be more sensible (e g only considering the crosstalk coupling strength to the specified receivers who are to benefit from the additional energy provided by the phantom channels, or only setting non-zero weightings to signals intended to benefit those specified receivers, etc.

Similarly, in a point-to-point embodiment in which the phantom channels are directly accessible at both ends of the link, the above methodology could be altered to instead seek to identify tertiary sets of phantom channels per tone which have the least amount of cross-talk coupling to any other channels to be used on that tone, and then to transmit distinct data over the phantom channels (i e to use them as normal distinct channels) As an example only of an adapted methodology for a point-to-point arrangement where the objective is to identify a tertiary subset of phantom channels to use in a point-to-point case where the ideal is to have minimum crosstalk leakage from the selected phantom channels to other channels the following steps may be performed.

11 For each tone
111 For each selectable phantom channel (the selectable phantom channels forming a first set of phantom channels)
1111 measure crosstalk coupling magnitude from the current phantom channel to each other channel in the system (excluding channels where the crosstalk coupling is negligible (e g. below a predetermined threshold) or for which it cannot be readily measured or for which it is reasonably expected to be below a predetermined threshold from topology considerations, etc.) and for all such magnitudes which exceed a minimum threshold value, sum them together to form a per tone, per phantom channel, aggregate crosstalk coupling value,
11.12 IF aggregate crosstalk coupling value is below a maximum threshold, select phantom channel as an option,
1.113 Consider next selectable phantom channel until all considered,
112 For remaining phantom channels {after each selectable phantom has been considered in steps 1 1.1 1 and 1.1.1 2) assign a per tone part score based on the aggregate crosstalk magnitude—e g give a score of 3 to the phantom having the lowest aggregate crosstalk, 2 to second lowest, 1 to third lowest and 0 to any others, or use the aggregate cross talk coupling magnitude to identify a per tone part score more directly (e g by subtracting it from the maximum threshold used in 1.1.1.2 such that phantom channels with an aggregate magnitude close to the maximum threshold have a low score (close to zero) whilst those with an aggregate magnitude much less than the maximum threshold have a high score), and record in an array indexed by tone number the phantom channel and its per tone part score,
113 Add each per tone part score to a corresponding current total score for that phantom channel (initialized to zero prior to step 11 and the start of the iteration through all tones) to keep a running total score for each selectable phantom channel
114 Consider next tone until all tones have been considered
12 Having obtained a set of total scores for each selectable phantom channel (over all tones), a sub-method 2 can then be employed to choose the top scoring phantom channels up to the max number that the MPAD can simultaneously connect (to the transmitter) to form a second set of phantom channels being a proper subset of the first set of channels (including some which are not mutually orthogonal in almost all practical cases since the MPAD can simultaneously connect more phantom channels than can be selected so as to be mutually orthogonal to one another) and control the MPAD to connect its output terminals to these phantom channels,
13 Then a sub-method 3 can be performed which may involve a second iteration through each tone such that for each tone,
1 3.1 identify for each tone a tertiary set of mutually orthogonal phantom channels as a proper subset of the second set, such that the summation of the per tone part scores of the phantom channels within the tertiary set is maximized 132 Once this has been done for each tone (thus generating (probably} a different tertiary set for each tone) end the method It will be apparent to persons skilled in the art that the above methods may be considered a multi-objective optimization problem (or a simpler single-objective simplification thereof) and can as such be carried out by the PC-MOP unit 1690 in some embodiments of the present invention as part of the method for generating the various precoding coefficients utilized by the MICOP and MRC precoder unit 1640.

Note that the above discussion is concerned only with determining which phantom channels to use for each tone and then either a weighting of 1 is applied to one signal and 0 to all others for a particular phantom channel based on the receiver with the recorded strongest crosstalk coupling to that phantom channel for that tone (for the point-to-multipoint case) or (for the alternative point-to-point methodology) no weightings are assigned at all since each phantom channel operates as a direct channel and carries its own signal. For situations where energy is to be injected into crosstalk coupled direct differential modes by means of crosstalk coupling, it may, however, be desirable to share a phantom channel with two different crosstalk coupled (direct, differential mode) channels. In such a case it may be beneficial to perform an algorithm to determine appropriate weighting values other than zero and (one) one in order to achieve some desired objective.

Having performed the above method to determine tertiary sets per tone and weightings (possibly even weightings between zero and one), etc, it may be advantageous to perform training with these weightings, tertiary sets, etc in order to identify the optimum precoding values to use. The amount of change required to trigger a redetermination of the tertiary sets (and possibly the weighting values, etc), and thus in turn to trigger a redetermination of the associated preceding coefficients, can be tuned to ensure that changes in the system are tracked reasonably well without unduly burdening the system by requiring the large number of calculations which the system must perform to be carried out at very regular intervals (which might be taxing for less powerful processors).

The above discussions have primarily related to a point-to-multipoint use case in which a single transmitter can coordinate and generate pre-processed signals which all depend upon one another and in which phantom channels can be accessed at the transmitter side but not at the receiver side (because there are multiple disparate receivers) and crosstalking is relied upon for transferring energy transmitted onto the phantom channels to a receiver. Another important use case for the present invention is where a transceiver arrangement is connected in a point-to-point manner with another transceiver arrangement connected via multiple pairs of wires. In such a case the phantom channels are accessible at both ends (e.g. via appropriate MPAD devices) and these phantom channels can carry their own separate data (which may of course then be combined—after having been separately received and detected etc—in higher layers).

Naturally, the method of selecting tertiary sets of phantom channels on a per tone basis can also be employed m a mixed point-to-point and point-to-multipoint arrangement. For example, a single Access Node may be in communication with some transceivers (e g other Access Nodes) via a point-to-point connection comprising multiple TMP's as well as to multiple disparate transceivers (e g end user DSL modems) via single respective TMP's.

In any arrangement where there are point-to-point connections with phantom channels accessible at both ends of the link, tertiary sets of phantom channels to use per tone are preferably selected based on how little cross-talk coupling they have to other channels rather than being preferably selected based on how much crosstalk coupling they have to other channels (as is done when the arm is to inject signal energy into a crosstalk coupled direct differential mode channel). An example of this is given above in the (second) methodology with steps 11 to 132 (rather than the first methodology with steps 1.1 to 133).

The invention claimed is:

1. A method of transmitting, using a discrete multi-tone modulation technique, data from a transmitter device over a plurality of pairs of wires to one or more receiver devices, each of the one or more receiver devices being connected to the transmitter device via at least one respective pair of wires, the one or more receiver devices being operable to receive signals detected as a change over time in a potential difference across local ends of each respective pair of wires extending between the receiver and the transmitter device, the transmitter device being operable to transmit signals onto the wires extending between the transmitter device and the one or more receiver devices in a plurality of different modes, over a plurality of different channels, the different modes including phantom and differential modes and the different channels including a first set of phantom channels, the method comprising:
   selecting a second set of phantom channels from the first set of phantom channels, the second set of phantom channels being a subset of the first set of phantom channels comprising some or all of the phantom channels of the first set of phantom channels such that at least some of the phantom channels in the second set of phantom channels are not mutually orthogonal to one another;
   connecting the selected phantom channels to the transmitter;
   transmitting signals from the transmitter onto the phantom channels of the second set of phantom channels;
   in respect of each of a plurality of different tones employed by the transmitter, selecting a tertiary set of phantom channels, each tertiary set of phantom channels being a proper subset of the second set of phantom channels and being selected so as to be mutually orthogonal to each other; and
   generating in a digital frequency domain a set of signals including at least one signal for each phantom channel in the second set of phantom channels,
   wherein for each respective tone, data is encoded only into phantom channels in the respective tertiary set of phantom channels for that tone, with signals associated with phantom channels not in the respective tertiary subset being set to a low-interference-causing value for that tone.

2. The method according to claim 1, further comprising compensating for resulting interference effects caused by use of non-mutually orthogonal phantom channels.

3. A non-transitory computer-readable storage medium storing processor implementable instructions configured to cause a processor to carry out the method of claim 1.

4. A transmitter device for transmitting data, using a discrete multi-tone modulation technique, over a plurality of pairs of wires to one or more receiver devices, each of the one or more receiver devices connected to the transmitter device via at least one respective pair of wires, each receiver device being operable to receive signals detected as a change over time in a potential difference across local ends of each respective pair of wires extending between the receiver device and the transmitter device, the transmitter device being operable to transmit signals onto the wires extending between the transmitter device and the one or more receiver devices in a plurality of different modes, over a plurality of different channels, the different modes including phantom and differential modes and the different channels including a first set of phantom channels, the transmitter being further operable to select a second set of phantom channels from the first set, the second set being a subset of the first set comprising some or all of the phantom channels of the first set such that at least some of the phantom channels in the second set are not mutually orthogonal to one another, the transmitter device comprising:

a connector for connecting the selected phantom channels of the second set of phantom channels to the transmitter device, the transmitter device being further operable to transmit signals from the transmitter device onto the phantom channels of the second set of phantom channels, and, in respect of each of a plurality of different tones employed by the transmitter device, to select a tertiary set of phantom channels, each tertiary set of phantom channels being a proper subset of the second set of phantom channels and being selected so as to comprise phantom channels which are mutually orthogonal to each other, the transmitter device being further operable to generate, in a digital frequency domain, a set of signals including at least one signal for each phantom channel in the second set of phantom channels, wherein, for each respective tone, data is encoded into signals for transmission over the phantom channels in the respective tertiary set of phantom channels for that tone and each signal associated with a phantom channel which is not in the respective tertiary subset for any given tone is set to a low-interference-causing value for that tone.

* * * * *